United States Patent
Horihata et al.

(10) Patent No.: US 8,547,071 B2
(45) Date of Patent: *Oct. 1, 2013

(54) ROTARY ELECTRIC MACHINE IMPROVED TO CARRY OUT LOAD-DUMP PROTECTION

(75) Inventors: Harumi Horihata, Nagoya (JP); Yoshihide Itoh, Kasugai (JP); Hideaki Nakayama, Tokoname (JP)

(73) Assignee: Denso Corporation, Kariya (JP)

( * ) Notice: Subject to any disclaimer, the term of this patent is extended or adjusted under 35 U.S.C. 154(b) by 146 days.

This patent is subject to a terminal disclaimer.

(21) Appl. No.: 13/173,884

(22) Filed: Jun. 30, 2011

(65) Prior Publication Data

US 2012/0001598 A1    Jan. 5, 2012

(30) Foreign Application Priority Data

Jun. 30, 2010   (JP) .................................. 2010-149664
Nov. 30, 2010   (JP) .................................. 2010-266604

(51) Int. Cl.
    *H02P 9/10* (2006.01)
(52) U.S. Cl.
    USPC .......................................................... 322/21
(58) Field of Classification Search
    USPC .............................................. 322/21, 12, 18
    See application file for complete search history.

(56) References Cited

U.S. PATENT DOCUMENTS

| | | | |
|---|---|---|---|
| 5,748,463 A | 5/1998 | Tsutsui et al. | |
| 6,353,307 B1 | 3/2002 | Koelle et al. | |
| 7,453,240 B2 * | 11/2008 | Yamauchi et al. | 322/12 |
| 7,629,776 B2 | 12/2009 | Chemin et al. | |
| 7,915,867 B1 * | 3/2011 | Bulthaup et al. | 322/18 |
| 8,067,910 B2 * | 11/2011 | Sejimo | 318/400.01 |

FOREIGN PATENT DOCUMENTS

| | | |
|---|---|---|
| JP | A-55-074324 | 6/1980 |
| JP | A-09-219938 | 8/1997 |
| JP | A-2002-523008 | 7/2002 |
| JP | B2-3396955 | 2/2003 |
| JP | B2-3396955 | 4/2003 |
| JP | A-2003-244864 | 8/2003 |
| JP | A-2007-189773 | 7/2007 |

OTHER PUBLICATIONS

Jan. 28, 2013 Office Action issued in U.S. Appl. No. 13/179,268.

* cited by examiner

*Primary Examiner* — Tulsidas C Patel
*Assistant Examiner* — Sean Gugger
(74) *Attorney, Agent, or Firm* — Oliff & Berridge, PLC

(57) ABSTRACT

In a rotary electric machine, a load-dump protector turns on a switching element as a low-side rectifying element for at least one of plural-phase stator windings when the output voltage exceeds a first threshold voltage due to load dump. The load dump protector determines a turnoff timing of the switching element as the low-side rectifying element for the at least one of the plural-phase stator windings after the output voltage, which exceeded the first threshold voltage once, falls below a second threshold voltage. The second threshold voltage is set to be lower than the first threshold voltage. The load dump protector turns off, at the determined turnoff timing, the switching element as the low-side rectifying element for the at least one of the at least two-phase stator windings.

14 Claims, 18 Drawing Sheets

ROTARY ELECTRIC MACHINE IMPROVED TO CARRY OUT LOAD-DUMP PROTECTION

CROSS REFERENCE TO RELATED APPLICATIONS

This application is based on Japanese Patent Applications 2010-149664 and 2010-266604 filed on Jun. 30, 2010 and on Nov. 30, 2010, respectively. This application claims the benefit of priority from the Japanese Patent Applications, so that the descriptions of which are all incorporated herein by reference.

TECHNICAL FIELD

The present disclosure relates to a rotary electric machine for generating electrical power and/or moving power, and more particularly, to such a rotary electric machine designed to carry out load-dump protection.

BACKGROUND

Power generators for motor vehicles are operative to supply electric power to a buttery for charging the buttery and to various electrical loads for allowing the electrical loads to operate. While such a power generator is operating to supply electric power to a battery and/or various electrical loads, the disconnection of the battery from the power generator, which is referred to as "load dump", causes a high voltage (a giant pulse) across a corresponding phase stator winding due to its large impedance. The peak of such a high voltage may get to be equal to or higher than 100 V depending on an output current of the power generator. Because this kind of a high voltage would damage any electrical loads and/or electrical elements in the power generator, some measures to reduce a high voltage have been taken.

A power generator disclosed in U.S. Pat. No. 5,748,463 corresponding to Japanese Patent Application Publication No. H09(1997)-219938 shows one of these measures. The power generator disclosed in the Patent Publication is provided with MOS transistors as low-side switching elements of a bridge rectifier thereof. The power generator is designed to, when the output voltage of the power generator exceeds a preset reference voltage, operate in protection mode to turn on at least one lower-side MOS transistor corresponding to at least one phase stator winding across which a high voltage due to load dump is generated, thus circulating current based on the high voltage through the bridge rectifier and the stator windings to decay the high voltage.

When the output voltage of the power generator becomes equal to or lower than the reference voltage based on the turn-on of the at least one low-side MOS transistor, the power generator is designed to turn off the at least one lower-side MOS transistor, and to shift to rectifying mode to carryout rectifying operations.

In addition, a power generator disclosed in Japanese Patent Application Publication No. 2003-244864 shows another of these measures. The power generator is designed to, when a high voltage is detected, shift to protection mode to drive each of high-side MOS FETs and low-side MOSFETs of a bridge rectifier in an on-off phase opposite to a normal on-off phase in rectifying mode. When the high voltage decays, the power generator is designed to shift to the rectifying mode to switch the on-off phase of each of the high- and low-side MOSFETs to the normal on-off phase in the rectifying mode.

SUMMARY

As described above, the power generator disclosed in the U.S. Pat. No. 5,748,463 turns on at least one low-side MOS transistor corresponding to at least one phase stator winding across which a high voltage due to load dump is generated when the output voltage exceeds the threshold voltage, and turns off the at least one low-side MOS transistor when the output voltage becomes lower than the threshold voltage. That is, the power generator disclosed in the U.S. Pat. No. 5,748,463 repeats on and off of an at least one MOS transistor corresponding to at least one phase stator winding across which a high voltage is generated until magnetic energy charged in the at least one phase stator winding sufficiently decays.

However, the turnoff behavior of the at least one lower-side MOS transistor results in instantaneous interruption of current flowing through the corresponding at least one phase stator winding connected to the at least one MOS transistor. The instantaneous interruption generates a high voltage across the corresponding phase stator winding, and the high voltage may exceed the reference voltage. That is, the measure disclosed in the U.S. Pat. No. 5,748,463 may take considerable time to sufficiently decay magnetic energy charged in the corresponding phase stator winding due to load dump. Thus, there is a need to sufficiently decay a high voltage due to load dump as immediately as possible.

In addition, the power generator disclosed in the JP Patent Publication No. 2003-244864 switches the present on-off phase of each of the high- and low-side MOSFETs to an on-off phase opposite to the present on-off phase when the power generator shifts to the protection mode at the occurrence of load dump, or cancels the protection mode to shift to the rectifying mode. Thus, if a current flows through a phase stator winding connected to at least one high or low-side MOSFET with the at least one high or low-side MOSFET is reversed in phase, a high voltage is generated across the phase stator winding. Particularly, if paired high and low-side switching elements for the same phase are simultaneously turned off, this simultaneous turnoff may result in instantaneous interruption of current flowing through a corresponding phase stator winding connected to the paired high and low-side switching elements. The instantaneous interruption may generate a surge across the corresponding phase stator winding. Thus, there is a need to prevent the occurrence of such a surge at mode shift of the power generator.

In view of the circumstances set forth above, one aspect of the present disclosure seeks to provide rotary electric machines designed to react these needs set forth above.

Specifically, an alternative aspect of the present disclosure aims to provide such rotary electric machines improved to immediately decay a high voltage due to load dump. A further aspect of the present disclosure aims to provide such rotary electric machines improved to prevent the occurrence of a surge at their mode shifts.

According to one aspect of the present disclosure, there is provided a rotary electric machine with a rotatable rotor. The rotary electric machine includes at least two-phase stator windings, and a rectifying unit including, for each of the at least two-phase stator windings, a pair of a high-side rectifying element and a low-side rectifying element. At least the low-side rectifying element is comprised of a switching element with a diode parallely connected thereto. The rectifying unit is configured to rectify an alternating current voltage induced each of the at least two-phase stator windings. The rotary electric machine includes a load-dump protector configured to monitor an output voltage of the rectifying unit, turn on the switching element as the low-side rectifying element for at least one of the at least two-phase stator windings when the output voltage exceeds a first threshold voltage due to load dump, and determine a turnoff timing of the switching element as the low-side rectifying element for the at least one of the at least two-phase stator windings after the output voltage, which exceeded the first threshold voltage once, falls below a second threshold voltage. The second threshold voltage is set to be lower than the first threshold voltage. The load-dump protector is configured to turn off, at the determined turnoff timing, the switching element as the low-side rectifying element for the at least one of the at least two-phase stator windings.

The one aspect of the present disclosure determines the turnoff timing of the switching element as the low-side rectifying element for the at least one of the at least two-phase stator windings. Thus, the one aspect of the present disclosure can determine the turnoff timing of the switching element except for timings at which there is a surge across the at least one of the at least two-phase stator windings due to turnoff of the switching element. This continues normal rectifying operations, thus decaying a high voltage without generating a surge.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

Figure 3:
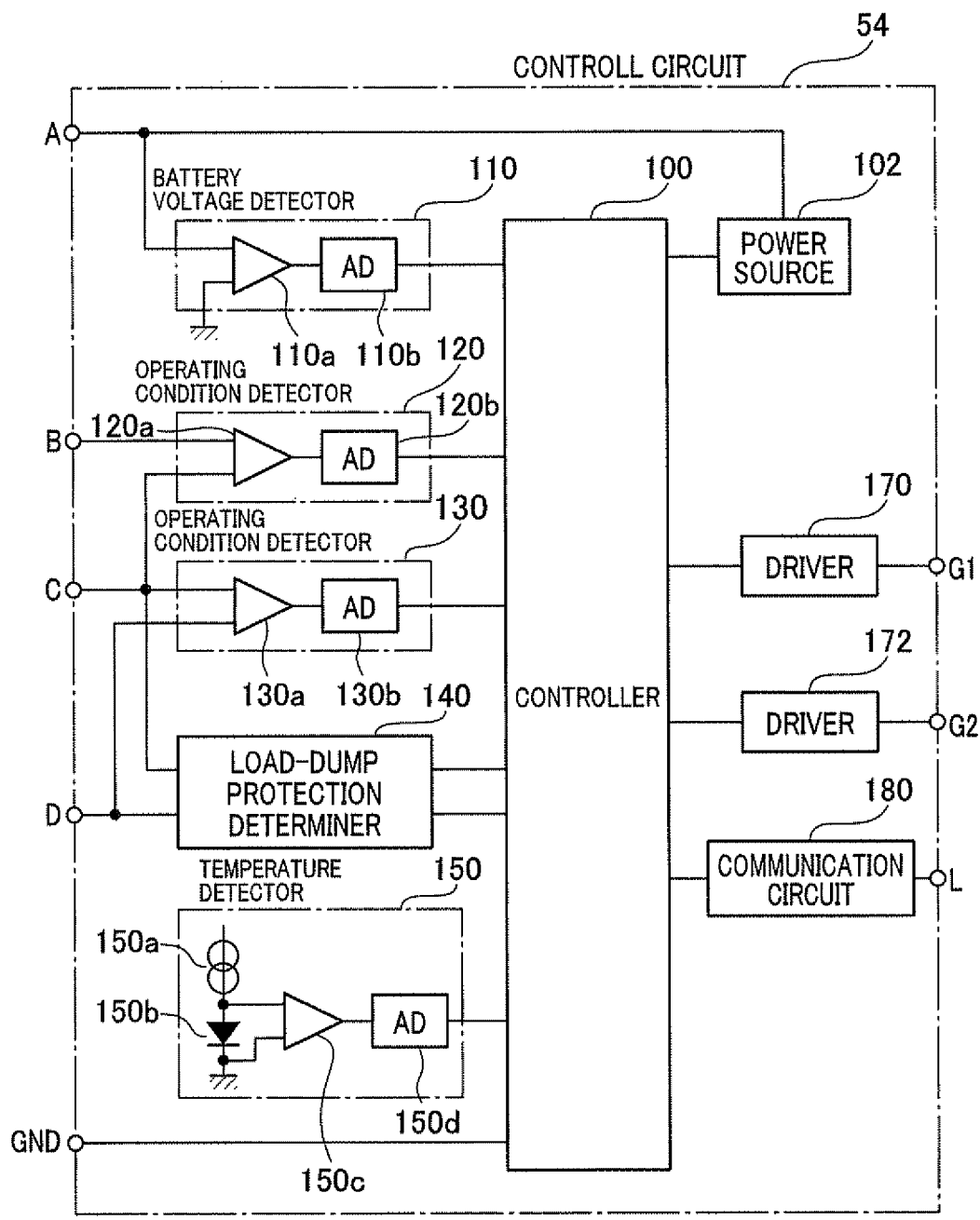
FIG. 3 is a circuit diagram schematically illustrating an example of the structure of a control circuit illustrated in FIG. 2.
Figure 5:
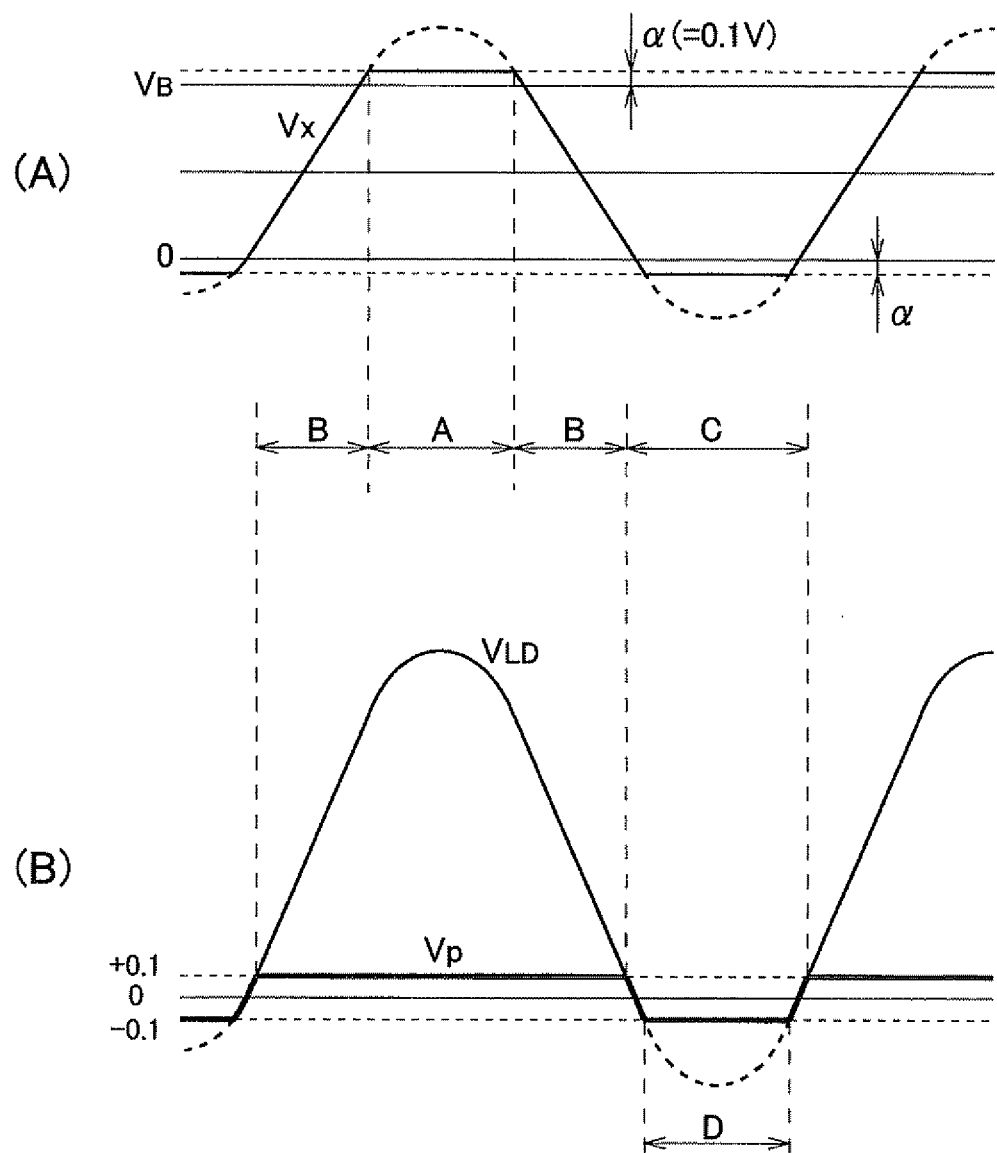
Figure 6:
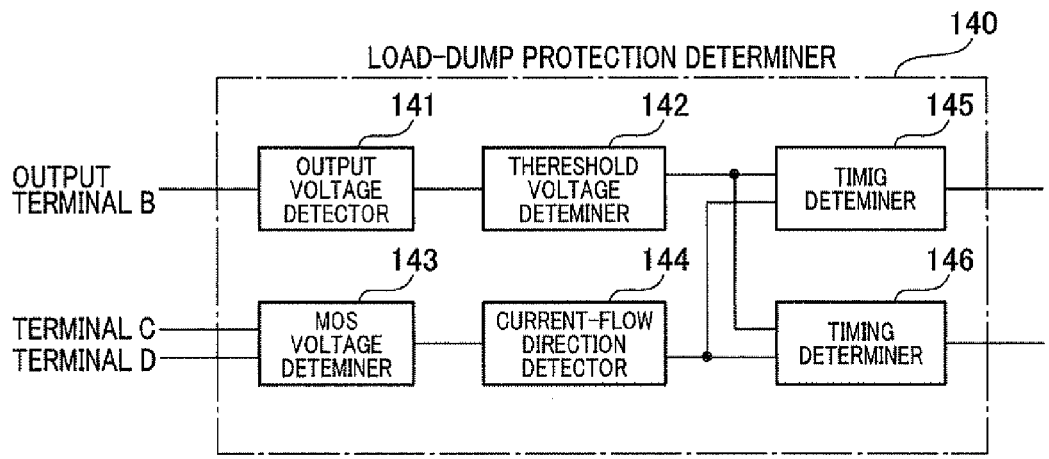
Figure 7:
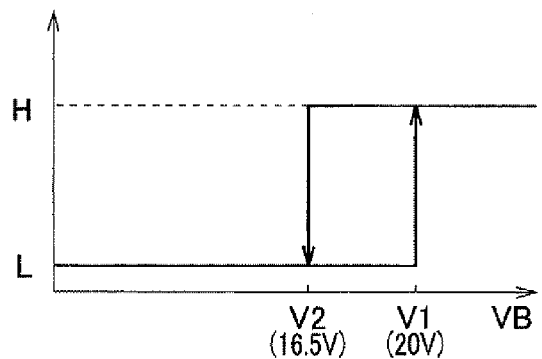
Figure 8:
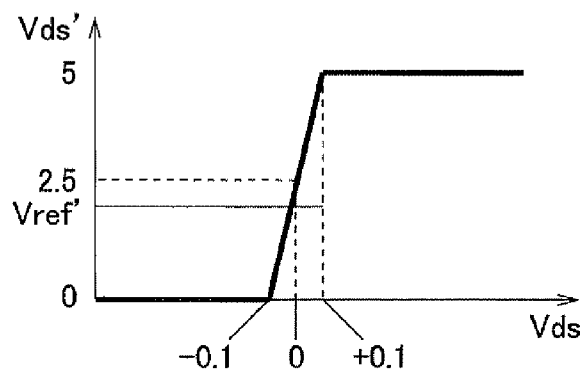
Figure 9:
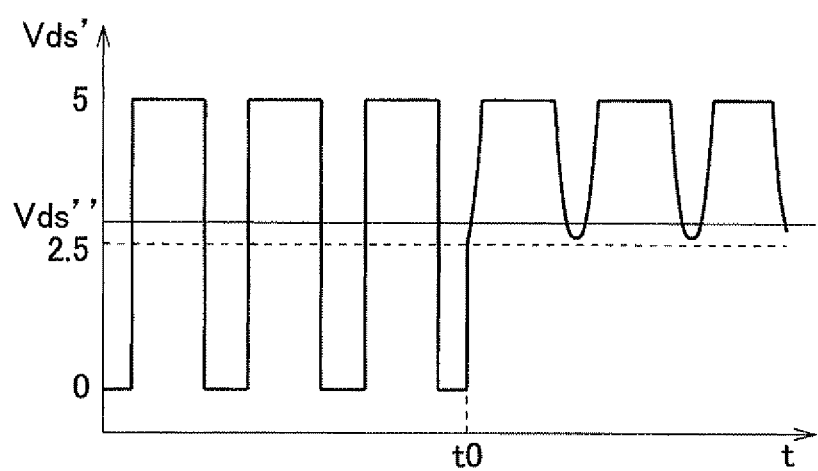
Figure 10:
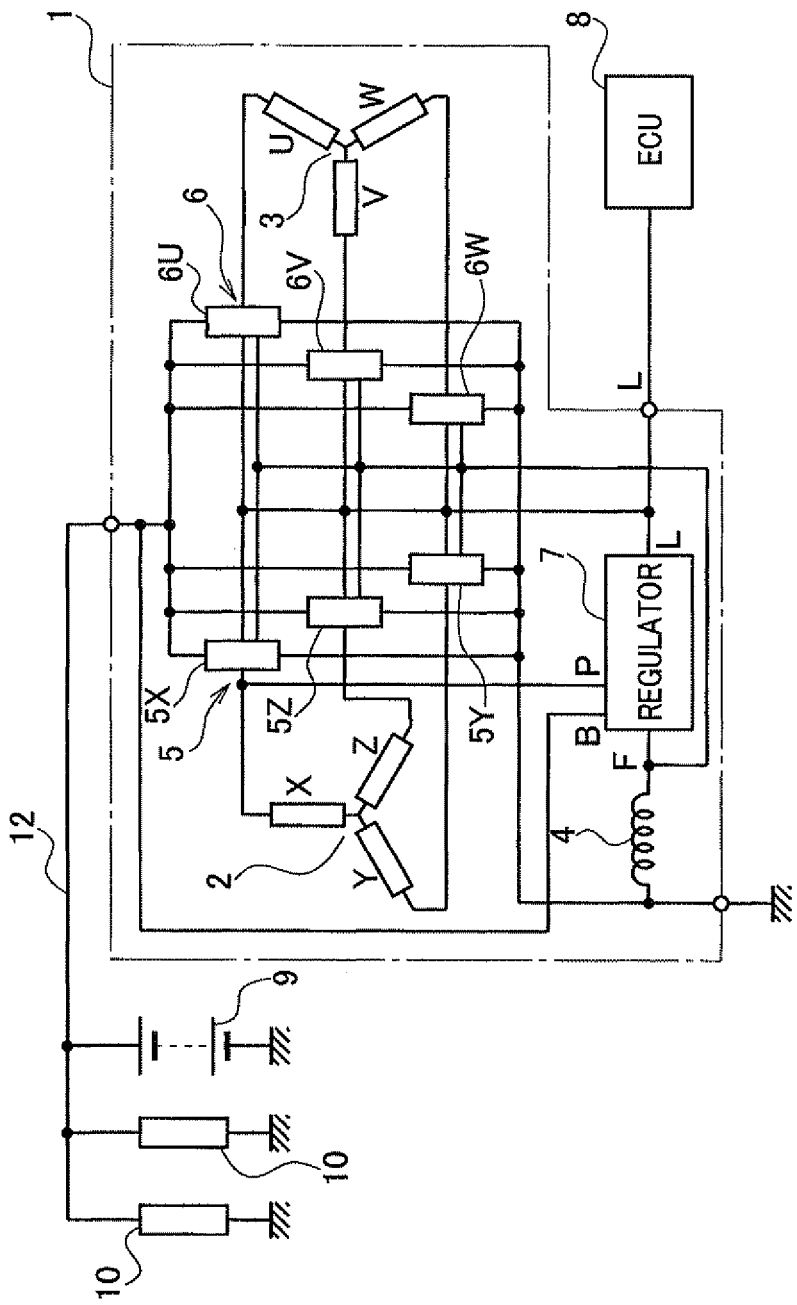
Figure 11:
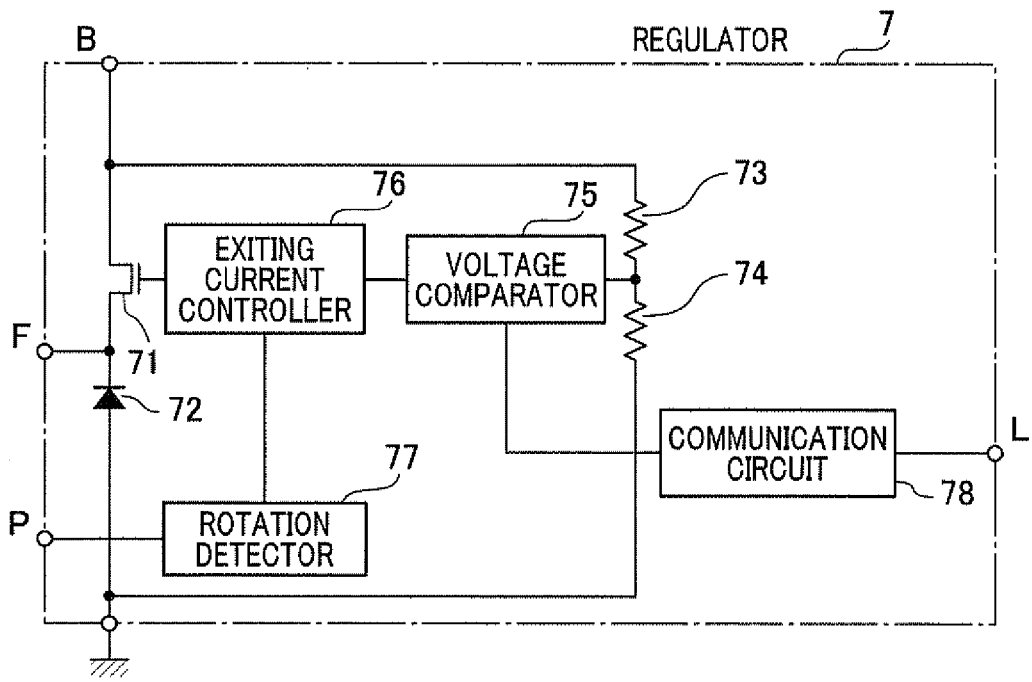
Figure 12:
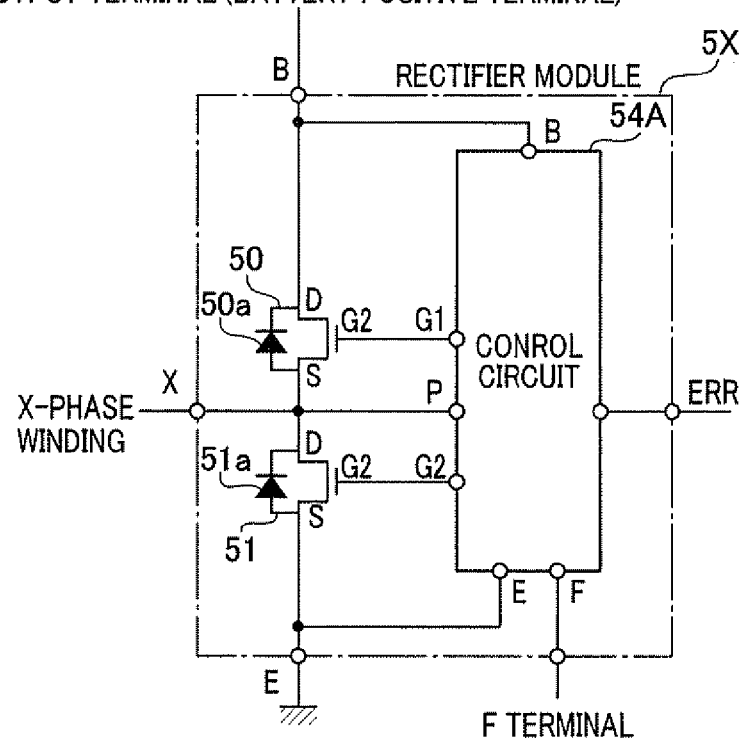
Figure 13:
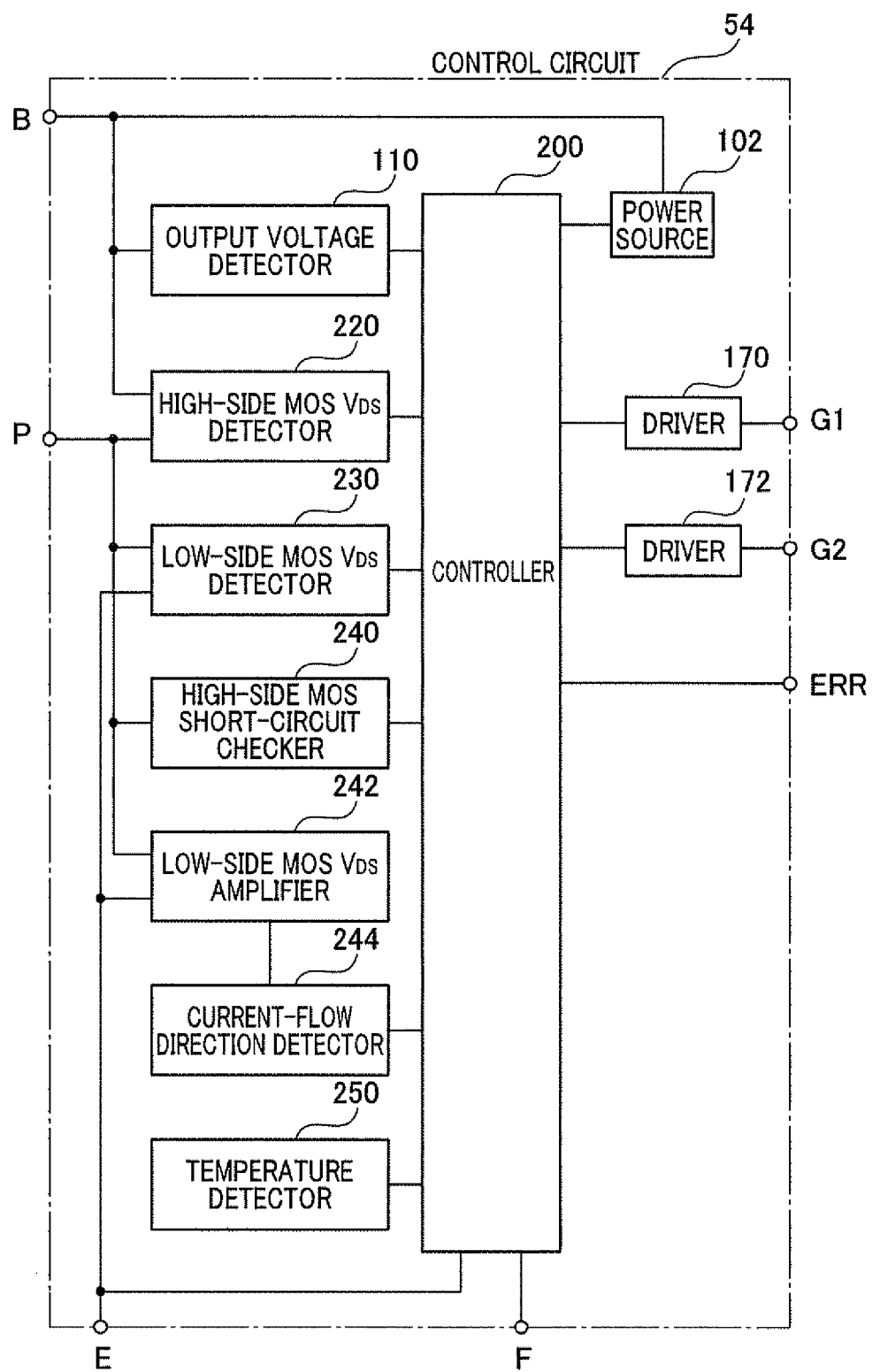
Figure 14:
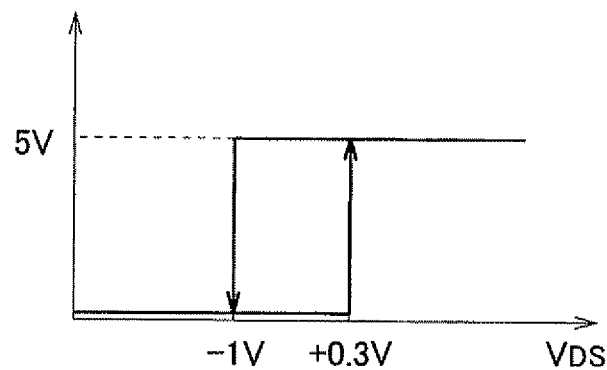
Figure 15:
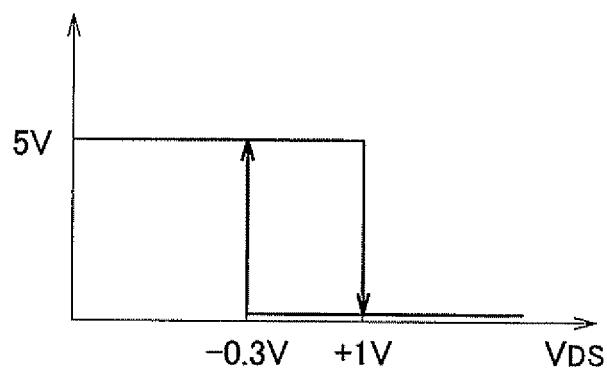
Figure 16:
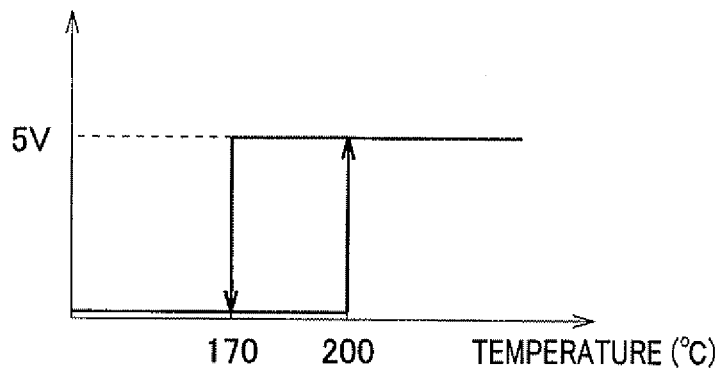
Figure 17:
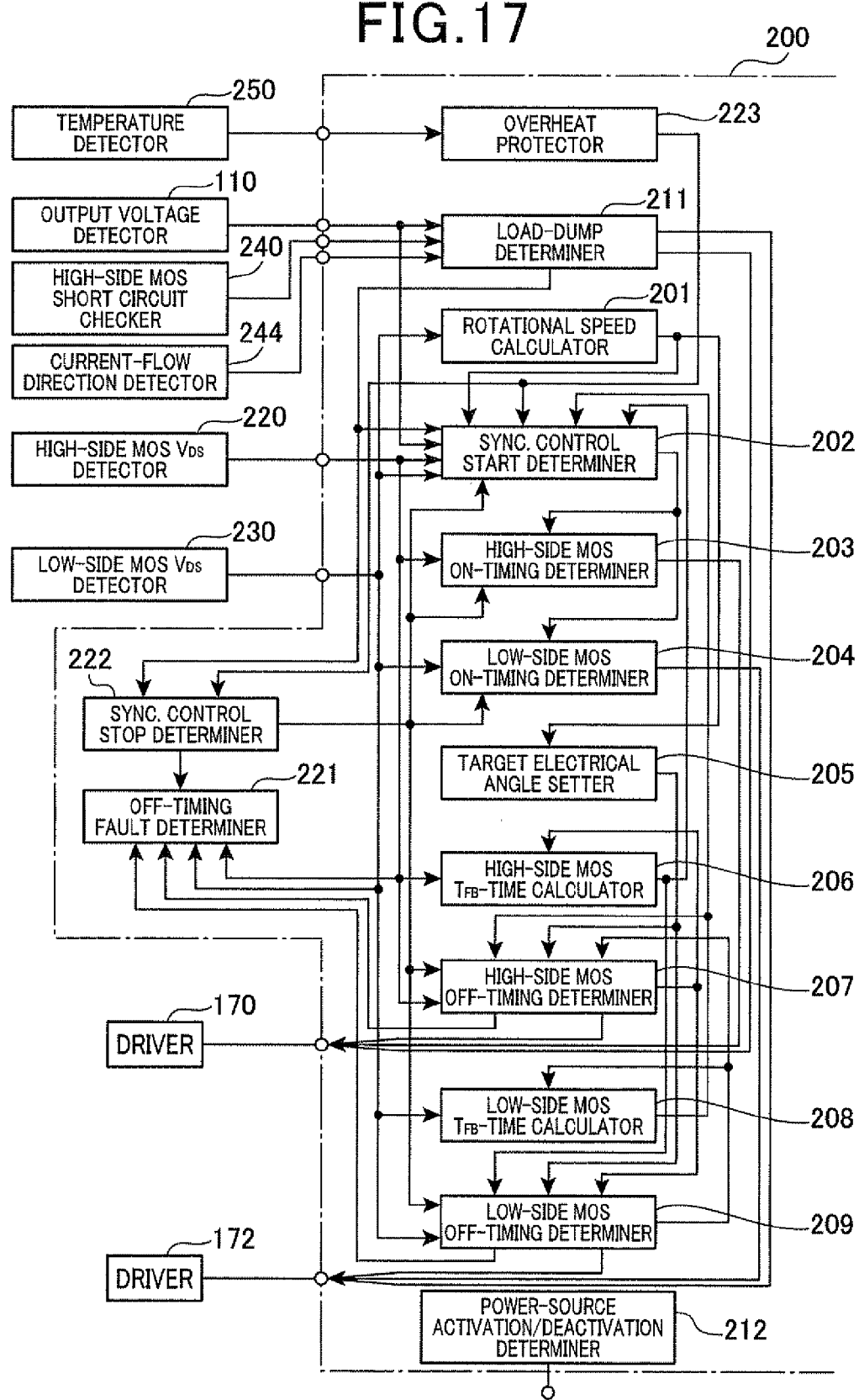
Figure 18:
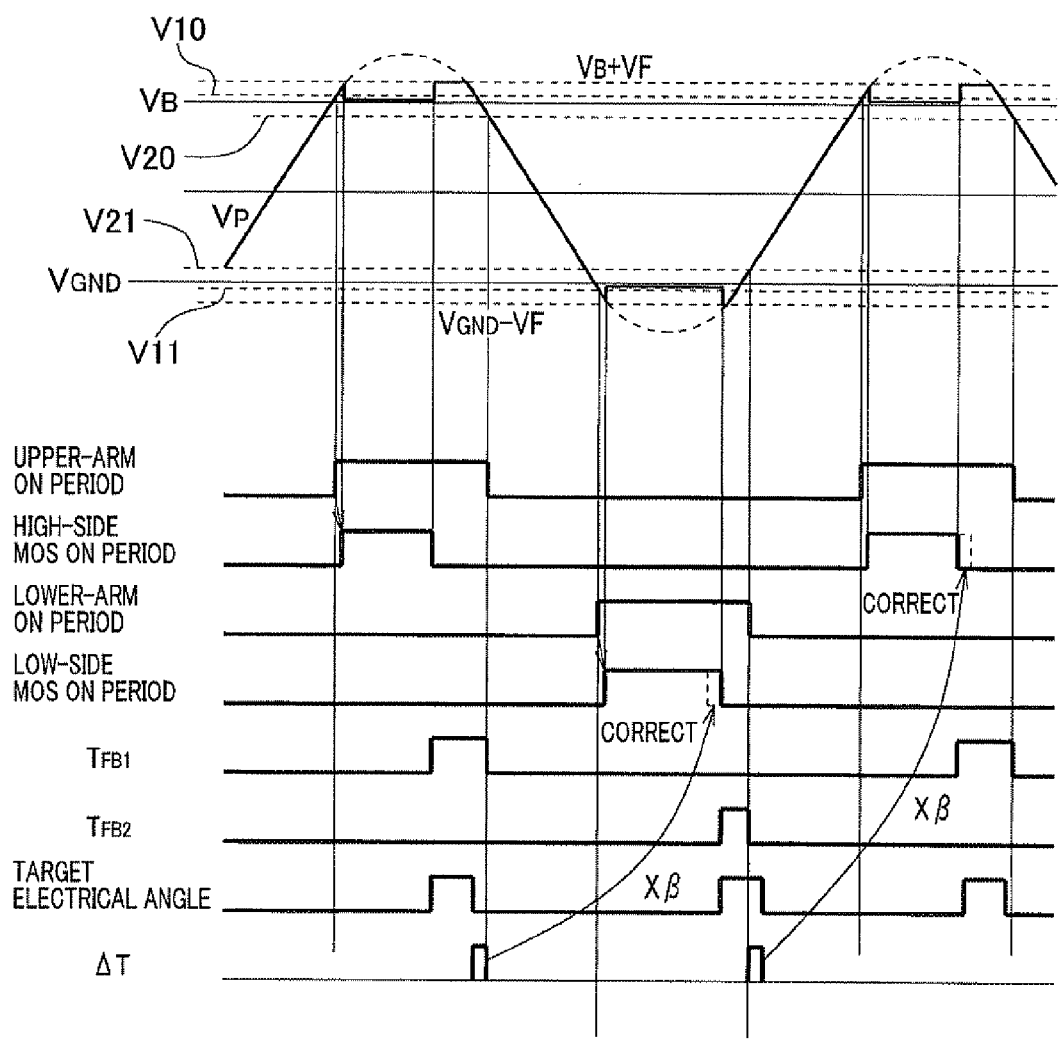
Figure 19:
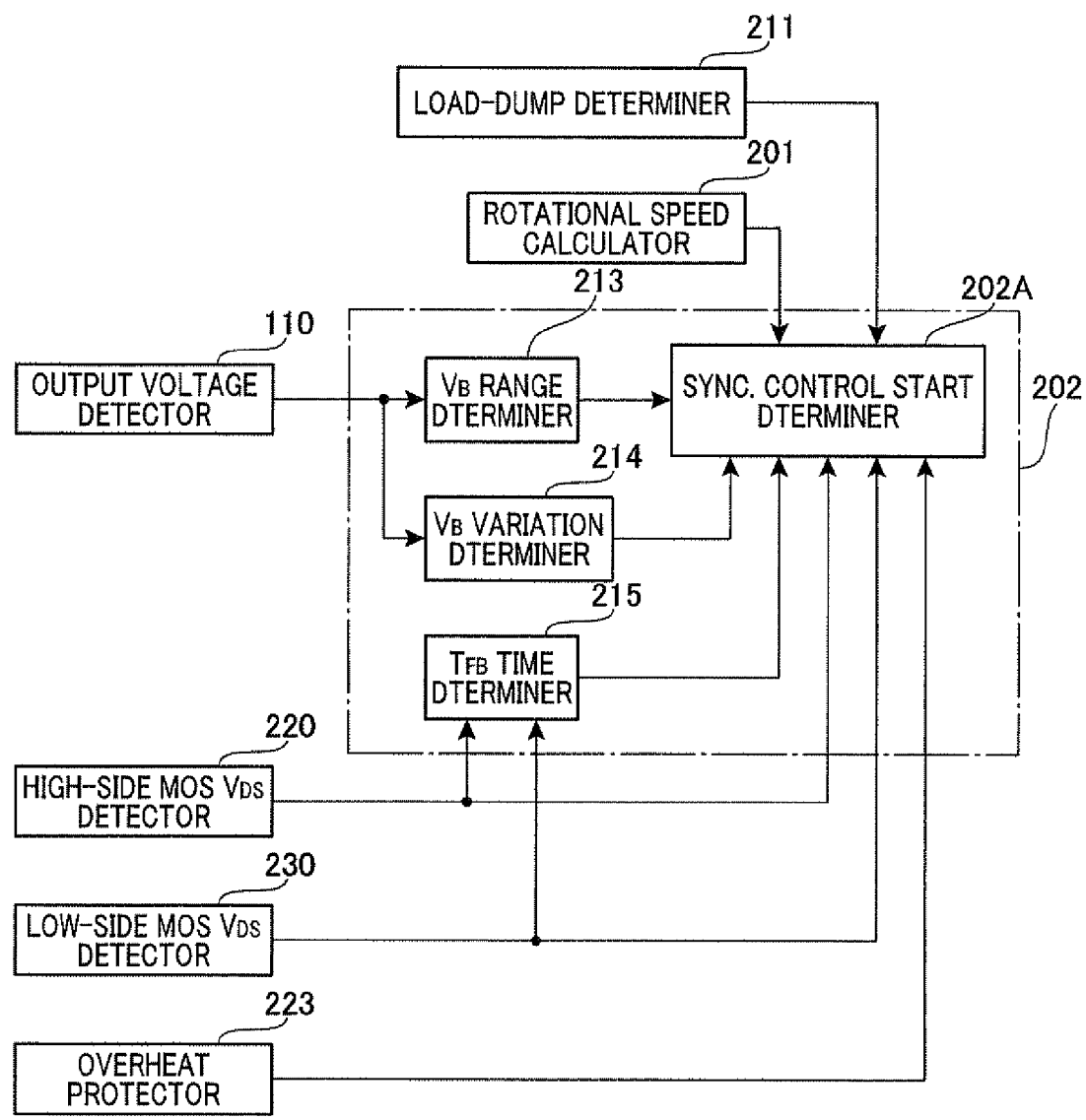
Figure 20:
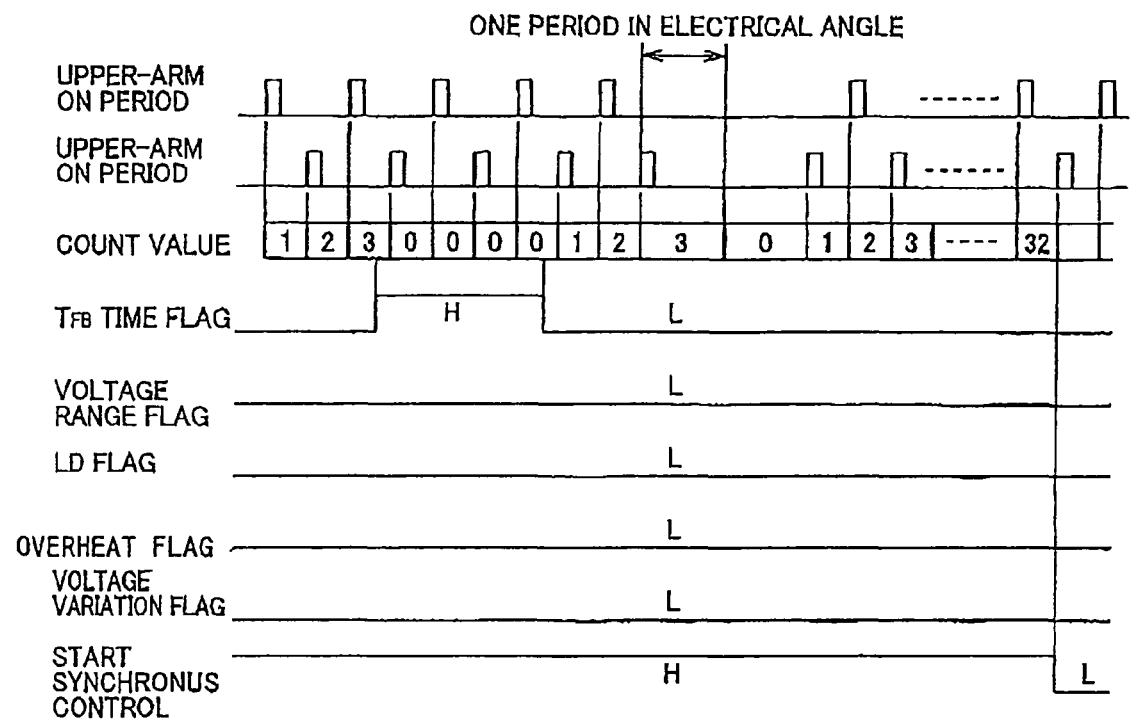
Figure 21:
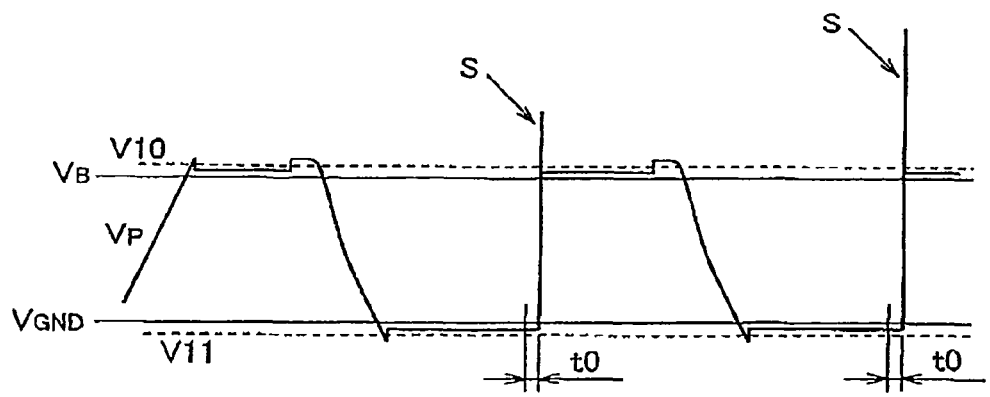
Figure 22:
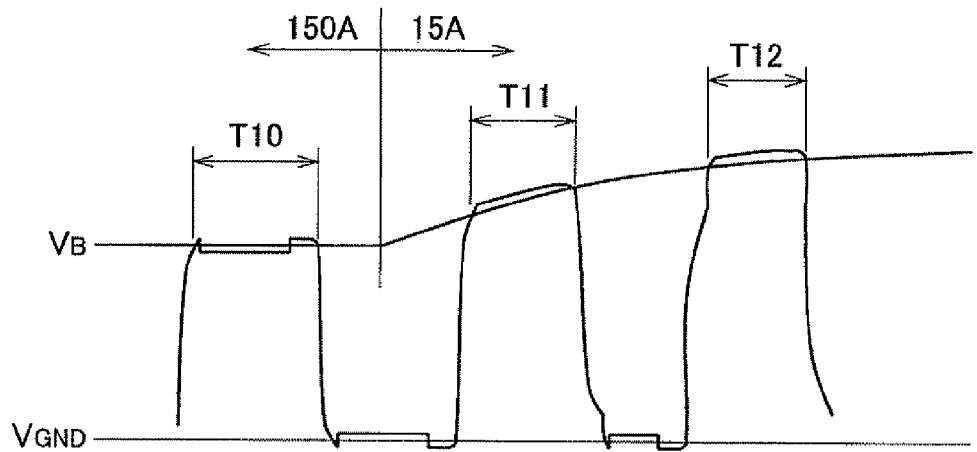
Figure 23:
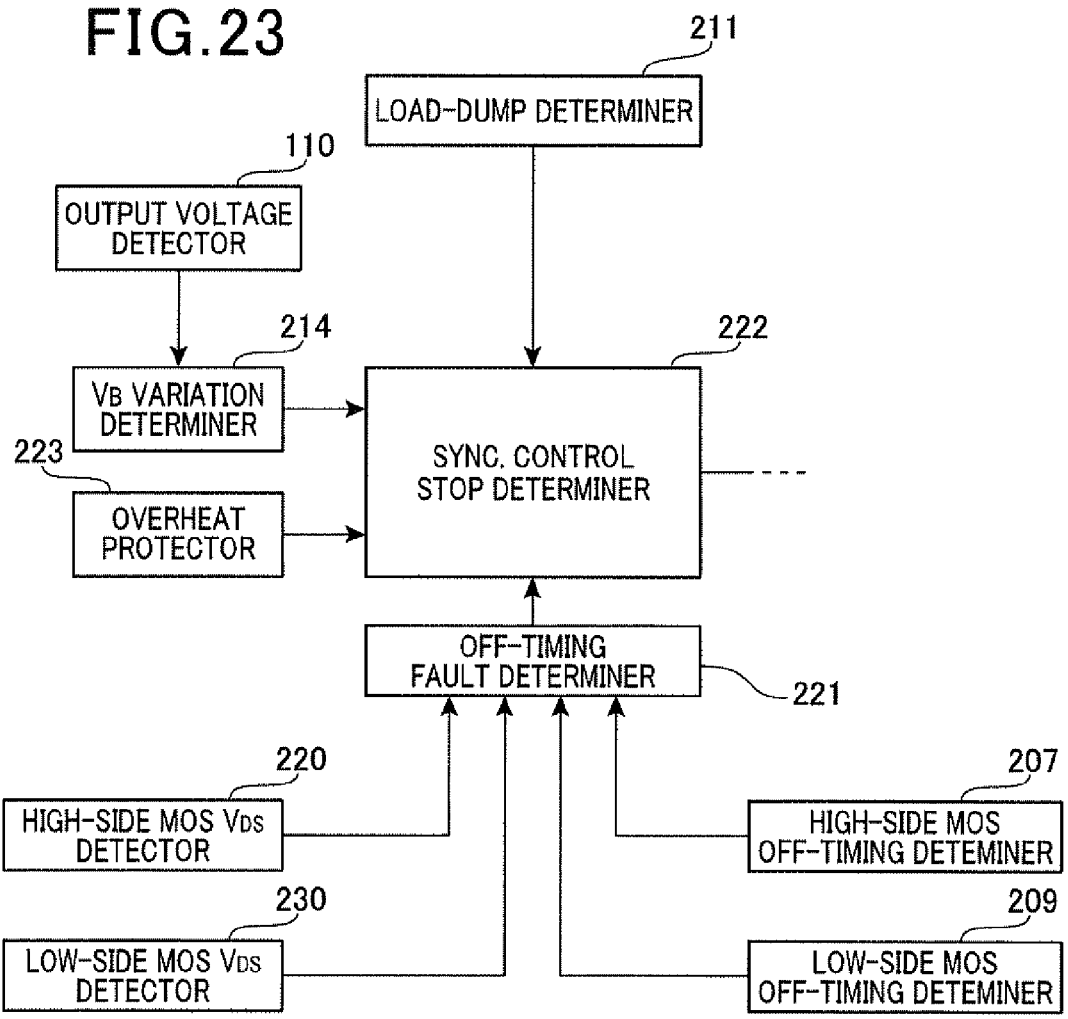
Figure 24A:
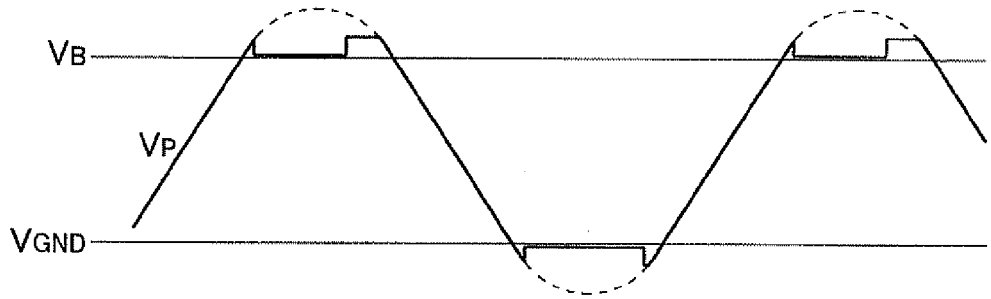
Figure 24B:
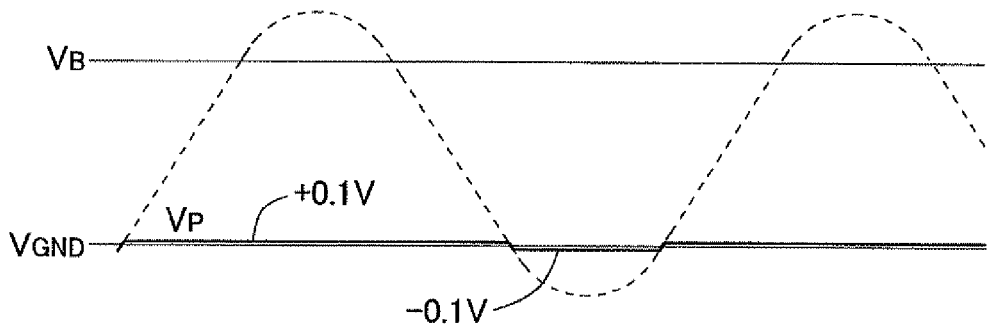
Figure 24C:
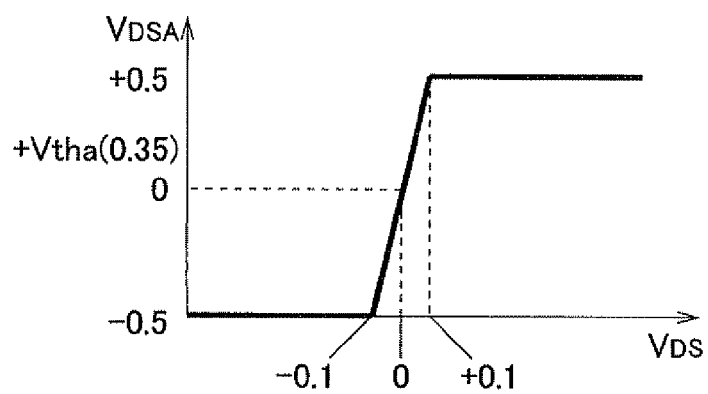
Figure 24D:
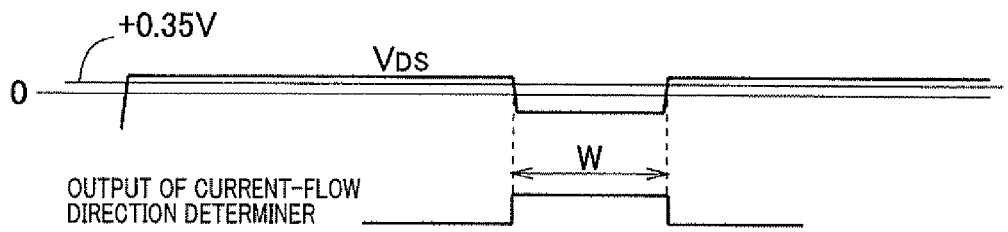
Figure 25:
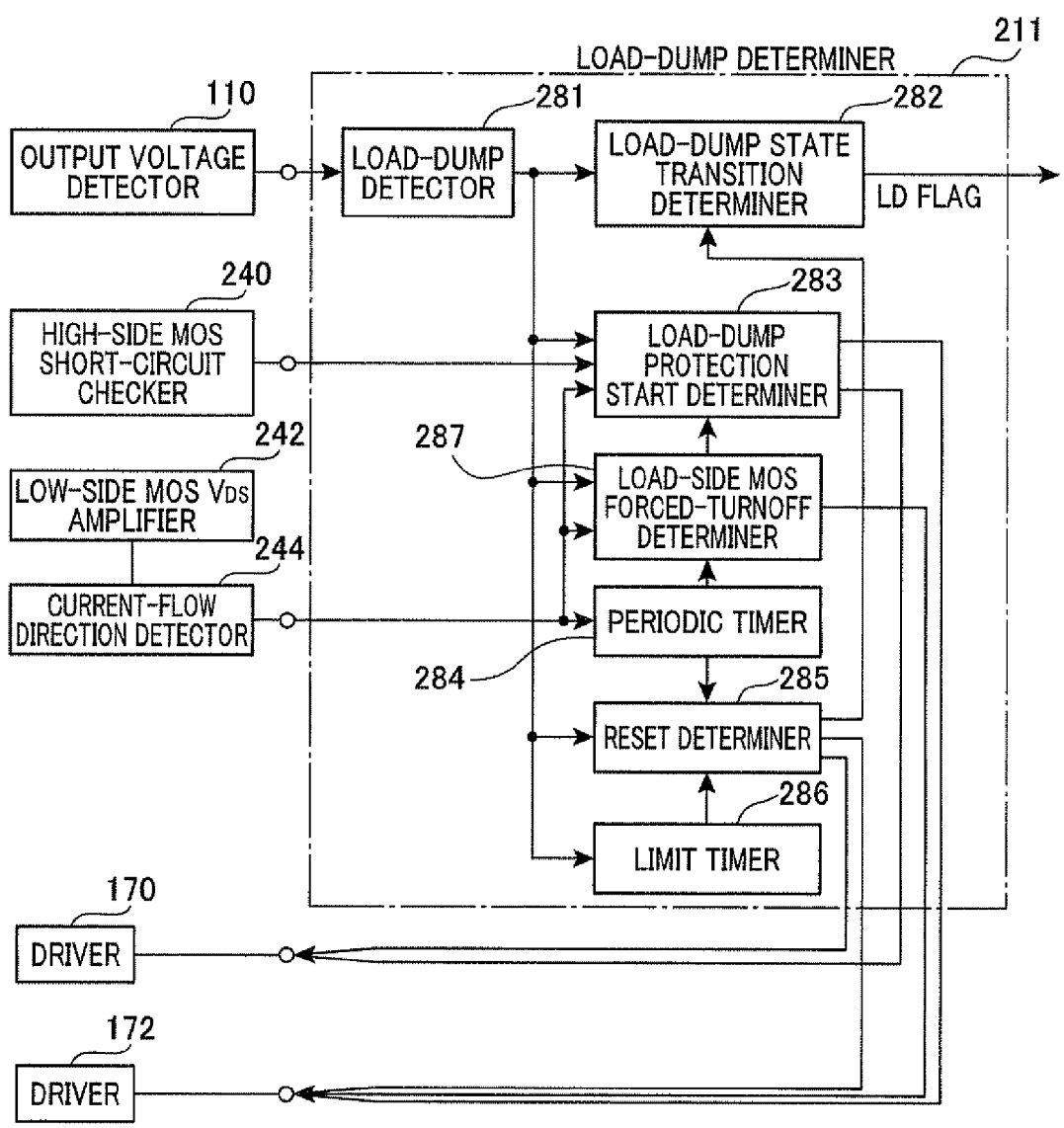

(A) of FIG. 5 is a graph schematically illustrating an example of the waveform of a phase voltage across a phase winding in a rectifying mode, and (B) of FIG. 5 is a graph schematically illustrating an example of the waveform of a high phase voltage generated across the phase winding due to load dump;

FIG. 6 is a block diagram schematically illustrating an example of the structure of a load-dump protection determiner illustrated in FIG. 3;

FIG. 7 is a graph schematically illustrating a relationship between an output voltage of the rotary electric machine and a result of determination by a threshold voltage determiner illustrated in FIG. 6;

FIG. 8 is a graph schematically illustrating a relationship between an amplified drain-source voltage and an amplified reference voltage according to the first embodiment;

FIG. 9 is a graph schematically illustrating the output of a MOS voltage detector illustrated in FIG. 6 if only one rectifier module for one of first and second stator windings shifts to a protection mode while the other rectifier modules do not shift to the protection mode according to the first embodiment;

FIG. 10 is a circuit diagram schematically illustrating an example of the system configuration of a rotary electric machine according to the second embodiment of the present invention;

FIG. 11 is a circuit diagram schematically illustrating an example of the structure of a regulator illustrated in FIG. 10;

FIG. 12 is a circuit diagram schematically illustrating a rectifier module illustrated in FIG. 10;

FIG. 13 is a circuit diagram schematically illustrating an example of the structure of a control circuit illustrated in FIG. 12;

FIG. 14 is a graph schematically illustrating how a high-side MOS $V_{DS}$ detector illustrated in FIG. 13 carries out comparing operations;

FIG. 15 is a graph schematically illustrating how a low-side MOS $V_{DS}$ detector illustrated in FIG. 13 carries out comparing operations;

FIG. 16 is a graph schematically illustrating schematic results of temperature detecting operations by a temperature detector illustrated in FIG. 13;

FIG. 17 is a circuit diagram schematically illustrating an example of the detailed structure of a controller illustrated in FIG. 13;

FIG. 18 is a timing chart schematically illustrating operations of the controller in synchronous rectification control mode (synchronous control mode), which corresponds to the rectifying mode according to the first embodiment;

FIG. 19 is a block diagram schematically illustrating some elements in the controller, which are required to determine whether to shift to the synchronous control mode according to the second embodiment;

FIG. 20 is a timing chart schematically illustrating operations of the controller to determine whether to start synchronous control (shift to the synchronous control mode) according to the second embodiment;

FIG. 21 is a graph schematically illustrating a specific example of the waveform of a phase voltage when an off-timing determined by a low-side MOS off-timing determiner illustrated in FIG. 17 is delayed;

FIG. 22 is a graph schematically illustrating a relationship between the variation in the output voltage and upper- and lower-arm on periods according to the second embodiment;

FIG. 23 is a block diagram schematically illustrating some elements in the controller, which are required to determine whether to shift out of the synchronous control mode according to the second embodiment;

FIG. 24A is a graph schematically illustrating an example of the waveform of a phase voltage across a phase winding in the synchronous control mode with no load dump;

FIG. 24B is a graph schematically illustrating an example of the waveform of the phase voltage after the occurrence of load dump in the protection mode;

FIG. 24C is a graph schematically illustrating a relationship between an amplified drain-source voltage and an amplified threshold voltage;

FIG. 24D is a graph schematically illustrating an example of the waveform of the amplified drain-source voltage of a low-side MOS transistor; and FIG. 25 is a block diagram schematically illustrating an example of the detailed structure of a load-dump determiner illustrated in FIG. 17 and some elements in the controller, which are required for the load-dump determiner to carry out load-dump protection in the protection mode.

DETAILED DESCRIPTION OF EMBODIMENT

Embodiments of the present disclosure will be described hereinafter with reference to the accompanying drawings. In the drawings, identical reference characters are utilized to identify identical corresponding components.

First Embodiment

Figure 1:
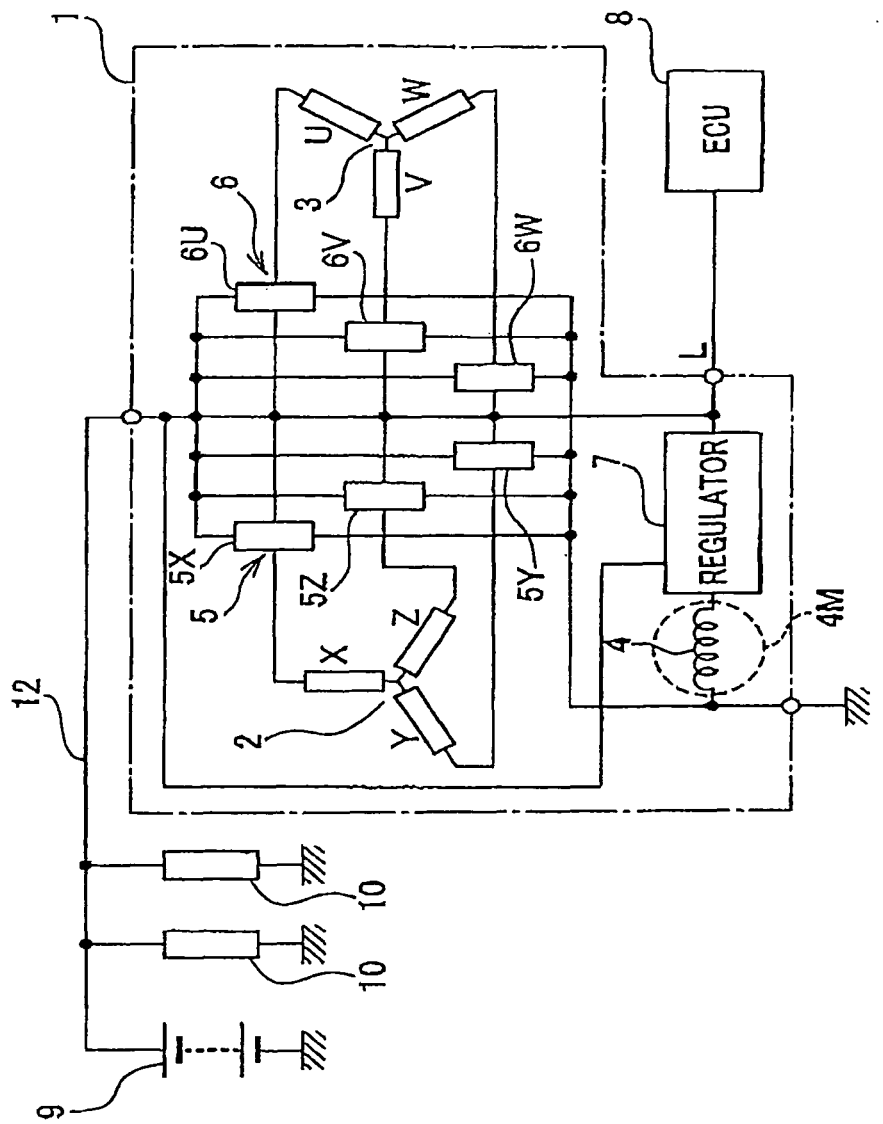
FIG. 1 is a circuit diagram schematically illustrating an example of the system configuration of a rotary electric machine according to the first embodiment of the present invention.

Referring to the drawings, particularly to FIG. 1, there is illustrated a rotary electric machine 1 according to the first embodiment of the present disclosure. In this embodiment, the present disclosure is applied to a three-phase power generator 1 as an example of rotary electric machines installed in a motor vehicle.

The power generator 1 includes first stator windings 2, second stator windings 3, a rotor 4M including a field winding 4, a pair of first and second rectifier-modules (module assemblies) 5 and 6, and a voltage regulator (regulator) 7. The first and second rectifier-module assemblies 5 and 6 serve as switching units.

The power generator 1 is operative to convert an alternating-current (AC) voltage induced in each of the first and second stator windings 2 and 3 into a DC voltage via a corresponding one of the first and second rectifier-module assemblies 5 and 6, and supply the DC voltage to a battery 9 via a charge line 12 to charge it therein, and/or the DC voltage to electrical loads 10 installed in the motor vehicle via the charge line 12.

The power generator 1 is also operative to convert a DC voltage supplied from the battery 9 into a three-phase AC voltage via the first and second rectifier-module assemblies 5 and 6, and apply the three-phase AC voltage to each of the first and second stator windings 2 and 3 to thereby generate rotary power (torque) to rotate the rotor 4M. For example, the rotor 4M is directly or indirectly coupled to a crankshaft of an internal combustion engine, referred to simply as an engine, installed in the motor vehicle so that the generated rotary power turns the crankshaft of the internal combustion engine.

The first stator windings 2 are for example multiphase stator windings, such as three-phase stator windings. The first stator windings 2 are wound in and around a cylindrical stator core. For example, the stator core has an annular shape in its lateral cross section, and a plurality of slots formed therethrough and circumferentially arranged at given pitches. The first stator windings 2 are wound in the slots of the stator core.

Similarly, the second stator windings 3 are for example multiphase stator windings, such as three-phase stator windings. The second stator windings 3 are wound in and around, for example, the stator core. For example, the second stator windings 3 are wound in the slots of the armature core such that the first stator windings 2 and the second stator windings 3 have a phase shift of 30 electrical degrees ($\pi/6$ radians) therebetween. The first and second stator windings 2 and 3 and the stator core constitute a stator of the power generator 1.

The first stator windings 2 consist of X-, Y-, and Z-phase windings, which are connected in, for example, a star configuration. The X-, Y-, and Z-phase windings each have one end connected to a common junction (neutral point), and the other end to a separate terminal. Similarly, the second stator windings 3 consist of U-, V-, and W-phase windings, which are connected in, for example, a star configuration. The U-, V-, and W-phase windings each have one end connected to a common junction (neutral point), and the other end to a separate terminal.

The rotor 4M is attached to, for example, a rotary shaft (not shown) and, for example, rotatably disposed within the stator core. One end of the rotary shaft is linked to directly or indirectly to the crankshaft of the internal combustion engine such that the rotor 4M and the rotary shaft are rotatably driven by the internal combustion engine (engine). In other words, rotation of the rotor 4M can be transferred to the crankshaft of the engine as rotary power so that the crankshaft can be rotated by the rotary power.

The rotor 4M includes a plurality of field poles disposed to face the inner periphery of the stator core, and a field winding 4 wound in and around the field poles. The field winding 4 is electrically connected with the regulator 7 via slip rings and the like. When energized by the regulator 7, the field winding 4 magnetizes the field poles with their alternative north and south polarities to thereby generate a rotor magnetic field. Note that, as the rotor 4M, a rotor comprising permanent magnets or a salient-pole rotor for generating a rotating magnetic field can be used. The rotating magnetic field induces an AC voltage in each of the first and second stator windings 2 and 3.

The first rectifier-module assembly 5 is disposed between the first stator windings 2 and the battery 9, and is constructed as a three-phase full-wave rectifier (bridge circuit) as a whole. The first rectifier-module assembly 5 is operative to convert the AC voltage induced in the first stator windings 2 into a DC voltage.

Specifically, the first rectifier-module assembly 5 is comprised of a number of, such as three, rectifier modules 5X, 5Y, and 5Z corresponding to the number of phase of the first stator windings 2. The rectifier module 5X is connected with the X-phase winding in the first stator windings 2, the rectifier module 5Y is connected with the Y-phase winding in the first stator windings 2, and the rectifier module 5Z is connected with the Z-phase winding in the first stator windings.

The second rectifier-module assembly 6 is disposed between the second stator windings 3 and the battery 9, and is constructed as a three-phase full-wave rectifier (bridge circuit) as a whole. The second rectifier-module assembly 6 is operative to convert the AC voltage induced in the second stator windings 3 into a DC voltage.

Specifically, the second rectifier-module assembly 6 is comprised of a number of, such as three, rectifier modules 6U, 6V, and 6Z corresponding to the number of phase of the second stator windings 3. The rectifier module 6U is connected with the U-phase winding in the second stator windings 3, the rectifier module 6V is connected with the V-phase winding in the second stator windings 3, and the rectifier module 6W is connected with the W-phase winding in the second stator windings 3.

The regulator 7 is designed to control a field current to flow through the field winding 4, thus regulating the output voltage of the power generator 1 (an output voltage of each rectifier module) to a target regulated voltage.

The regulator 7 is connected with an ECU (external controller) 8 via its communication terminal and communication line. The regulator 7 is operative to carry out serial bidirectional communications, such as LIN (Local Interconnect Network) communications in accordance with LIN protocols, with the ECU 8, thus sending and/or receiving communication messages to and/or from the ECU 8.

Next, an example of the structure of the rectifier module 5X according to this embodiment will be fully described hereinafter.

Figure 2:
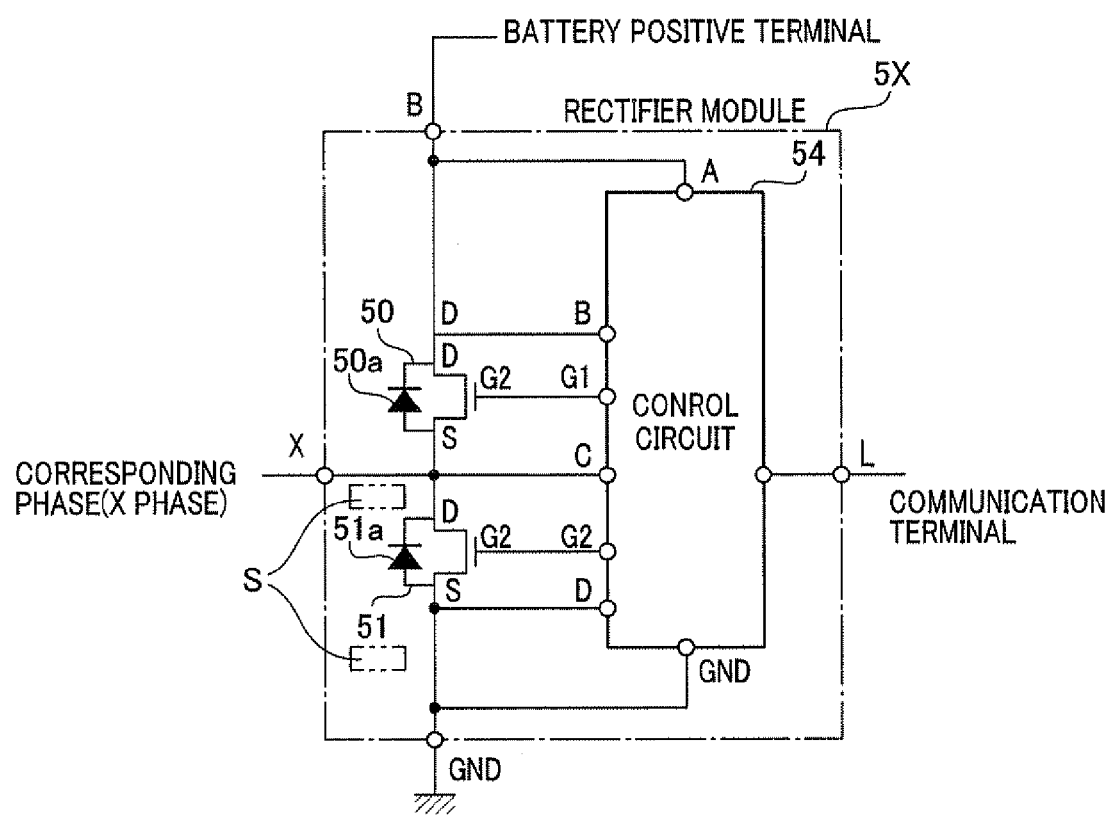
FIG. 2 is a circuit diagram schematically illustrating an example of the structure of a rectifier module illustrated in FIG. 1.

FIG. 2 schematically illustrates the structure of the rectifier module 5X according to this embodiment. Each of the other rectifier modules 5Y, 5Z, 6U, 6Y, and 6Z has the same structure as the rectifier module 5X. Referring to FIG. 2, the rectifier module 5X is comprised of a pair of MOS transistors 50 and 51, and a control circuit 54, and has terminals B, X, L, and GND.

The source S of the MOS transistor 50 is connected with a corresponding phase winding, such as the X-phase winding, of the first stator windings 2 via the terminal X, and the drain D is connected with the positive terminal of the battery 9 and the electric loads 10 via the charge line 12 and the terminal B of the rectifier module 5X. Thus, the MOS transistor 50 serves as a high-side (upper arm) switching element. An intrinsic diode (body diode) 50a is intrinsically provided in the MOS transistor 50 to be connected in parallel thereto. That is, the anode of the intrinsic diode 50a is connected with the source of the MOS transistor 50, and the cathode is connected with the drain thereof.

The drain D of the MOS transistor 51 is connected with a corresponding phase winding, such as the X-phase winding, of the first stator windings 2 via the terminal X and with the source S of the MOS transistor 50. The source S of the MOS transistor 51 is connected with the negative terminal of the battery 9 connected with a signal ground via the terminal GND. Thus, the MOS transistor 51 serves as a low-side (lower arm) switching element. An intrinsic diode (body diode) 51a is intrinsically provided in the MOS transistor 51 to be connected in parallel thereto. That is, the anode of the intrinsic diode 51a is connected with the source of the MOS transistor 51, and the cathode is connected with the drain thereof.

In other words, the high- and low-side MOS transistors 50 and 51 are connected with each other in series via a connecting point, and the X-phase winding of the first stator windings 2 is connected with the connecting point between the source S of the MOS transistor 50 and the drain D of the MOS transistor 51.

Note that an additional diode can be connected in parallel to each of the MOS transistors 50 and 51. A switching element with a type different from the MOS transistor type can be used as at least one of the MOS transistors 50 and 51. In this modification, a diode is added to be connected in parallel to the switching element.

FIG. 3 schematically illustrates an example of the structure of the control circuit 54 in detail. Referring to FIG. 3, the control circuit 54 includes a controller 100, a power source 102, an output voltage detector 110, an operating condition detector 120, an operating condition detector 130, a load-dump protection determiner 140, a temperature detector 150, drivers 170 and 172, and a communication circuit 180. The control circuit 54 has, for example, seven terminals A, B, C, D, G1, G2, L, and GND. The ground terminal GND is connected via the ground terminal GND of the rectifier module 5X with the signal ground.

The power source 102 is connected with the controller 100 and the A terminal; the A terminal is connected with the terminal B of the rectifier module 5X and the drain D of the MOS transistor 50. When the rotor 4M starts to turn by the rotation of the crankshaft of the engine so that an X-phase voltage is generated across the X-phase winding, the X-phase voltage is inputted to the power source 102 for example via the terminal C. Then, the power source 102 generates a substantially constant voltage based on, for example, the output voltage of the power generator 1, and supply the constant voltage as an operating voltage to each component included in the control circuit 54. These operating voltage generating operations are substantially identical to those of normal regulators.

The driver 170 is connected with the controller 100. The driver 170 has an output terminal corresponding to the terminal G1, and the output terminal G1 is connected with the gate G of the high-side MOS transistor 50. The driver 170 is operative to generate a drive signal (voltage signal) to be applied to the gate of the high-side MOS transistor 50 for turning on and off the MOS transistor 50.

The driver 172 is connected with the controller 100. The driver 172 has an output terminal corresponding to the terminal G2, and the output terminal G2 is connected with the gate of the low-side MOS transistor 51. The driver 172 is operative to generate a drive signal (voltage signal) to be applied to the gate of the low-side MOS transistor 51 for turning on and off the MOS transistor 51. For example, the drive signal to be outputted from each of the drivers 171 and 172 is a pulse signal with a controllable duty cycle, that is, the ratio of a controllable pulse width or a controllable on time to a corresponding period (on time+off time).

The output voltage detector 110 is connected with the terminal A and with the controller 100. The output voltage driver 110 is comprised of a differential amplifier 110a and an A/D converter 110b. The input terminals of the differential amplifier 110a are connected with the signal ground and the terminal A. The output terminal of the differential amplifier 110a is connected with the input terminal of the A/D converter 110b. The differential amplifier 110a is operative to output the potential difference between the voltage (output voltage) at the positive terminal of the battery 9 connected with the output terminal 13 of the power generator 1 via the charge line 12 and the ground voltage. That is, the differential amplifier 110a outputs the voltage at the positive terminal of the battery 9 with the voltage little affected from noise as a battery voltage. The A/D converter 110b is operative to convert the battery voltage into digital data whose value corresponds to the battery voltage, and output, to the controller 100, the digital data. The A/D converter 110b can be provided in the controller 100.

The operating condition detector 120 is connected with the terminals B and C and the controller 100; the terminal B is connected with the drain D of the high-side MOS transistor 50. The operating condition detector 120 is comprised of a differential amplifier 120a and an A/D converter 120b. The input terminals of the differential amplifier 120a are connected with the drain D of the high-side MOS transistor 50 via the terminal C and the source S of the high-side MOS transistor 50 via the terminal B. The output terminal of the differential amplifier 120b is connected with the input terminal of the A/D converter 120b. The differential amplifier 120a is operative to output the voltage difference between the drain D and the source S of the high-side MOS transistor 50 as "drain-source voltage $V_{DS}$", in other words, the difference between the voltage at the terminal B and the voltage at the terminal C illustrated in FIGS. 2 and 3. The A/D converter 120b is operative to convert the drain-source voltage $V_{DS}$ into digital data whose value corresponds to the drain-source voltage $V_{DS}$, and output, to the controller 100, the digital data. The controller 100 is operative to receive the digital data, monitor the operating conditions of the MOS transistor 50 based on the digital data corresponding to the drain-source voltage, control the duty cycle of the MOS transistor 50 based on the monitored operating conditions, and determine whether there is a fault in the MOS transistor 50 based on the monitored operating conditions.

The operating condition detector 130 is connected with the terminal C and D and the controller 100; the terminal D is connected with the source S of the low-side MOS transistor 51. The operating condition detector 130 is comprised of a differential amplifier 130a and an A/D converter 130b. The input terminals of the differential amplifier 130a are connected with the drain D of the low-side MOS transistor 51 via the terminal C and the source S of the low-side MOS transistor 51 via the terminal D. The output terminal of the differential amplifier 130b is connected with the input terminal of the A/D converter 130b. The differential amplifier 130a is operative to output the voltage difference between the drain D an the source S of the low-side MOS transistor 51 as "drain-source voltage $V_{DS}$", in other words, the difference between the voltage at the terminal D and the voltage at the terminal C illustrated in FIGS. 2 and 3. The A/D converter 130b is operative to convert the drain-source voltage $V_{DS}$ into digital data whose value corresponds to the drain-source voltage $V_{DS}$, and output, to the controller 100, the digital data. The controller 100 is operative to receive the digital data, monitor the operating conditions of the MOS transistor 51 based on the digital data corresponding to the drain-source voltage, control the duty cycle of the MOS transistor 51 based on the monitored operating conditions, and determine whether there is a fault in the MOS transistor 51 based on the monitored operating conditions.

The load-dump protection determiner 140 is connected with the terminal B of the rectifier module 5X via the terminal A, and with the terminals C and D. The load dump-protection determiner 140 monitors the voltage $V_B$ at the output terminal B (the terminal A) of the power generator 1, that is, the battery voltage $V_B$ or the output voltage $V_B$ of the power generator 1. If the output voltage $V_B$ exceeds a first threshold voltage V1, such as 20 V, the load-dump protection determiner 140 outputs, to the controller 100, an instruction (protection start instruction) that instructs the controller 100 to operate in protection mode. Thereafter, if the output voltage $V_B$ drops to become lower than a second threshold voltage V2, such as 16.5 V lower than the first threshold voltage V1, the load-dump protection determiner 140 outputs, to the controller 100, an instruction (rectification restart instruction) that instructs the controller 100 to shift from the protection mode to rectifying mode to restart rectifying operations.

For example, the load-dump protection determiner 140 according to the first embodiment is designed as an analog circuit comprised of various active and passive elements in order to immediately perform its process.

The controller 100 is adapted to operate in the rectifying mode or the protection mode according to any one of the protection start instruction and the rectification restart instruction. The detailed structure of the load-dump protection determiner 140 and operations of the controller 100 in the protection mode and operations thereof during the shift from the protection mode to the rectifying mode will be described later.

The temperature detector 150 is connected with the controller 100. The temperature detector 150 is comprised of a constant current source 150a, a diode 150b, a differential amplifier 150c, and an A/D converter 150d. The input terminals of the differential amplifier 150c are connected with the respective anode and cathode of the diode 150b, and the output terminal is connected with the A/D converter 150d. The anode of the diode 150b is connected with the constant current source 150a. Thus, the differential amplifier 150c outputs a forward voltage drop across the diode 150b, which depends on temperature of the rectifier module 5X. The A/D converter 150d converts the forward voltage drop into digital data whose value corresponds to the forward voltage drop, and output, to the controller 100, the digital data. The controller 100 is operative to receive the digital data and detect the temperature of the rectifier module 5X based on the digital data. The temperature detector 150 can be provided in the controller 100.

The communication circuit 180 is connected with the controller 100 and the terminal L. Like the regulator 7, the communication circuit 180 is operative to carry out serial bidirectional communications, such as LIN (Local Interconnect Network) communications in accordance with LIN protocols, with the ECU 8 via the terminal L, thus sending and/or receiving communication messages to and/or from the ECU 8.

For example, each of the regulator 7 and the communication circuit 180 can transmit or receive one message frame to or from the ECU 8 at 20 ms (milliseconds). In other words, each of the regulator 7 and the communication circuit 180 can transmit or receive 50 message frames per second.

Thus, even if the number of message frames to be communicated between each of the rectifier modules is increased, the regulator 7 can transmit and/or receive, to and/or from the ECU 8, message frames including information indicative of the state of the generated output of the power generator 1 and diagnostic information without being affected from the communications between each rectifier module and the ECU 8.

Next, operations of the control circuit 54 of a rectifier module 5 in the protection mode and operations of the control circuit 54 of the rectifier module 5 during the shift from the protection mode to the rectifying mode will be described hereinafter.

Figure 4:
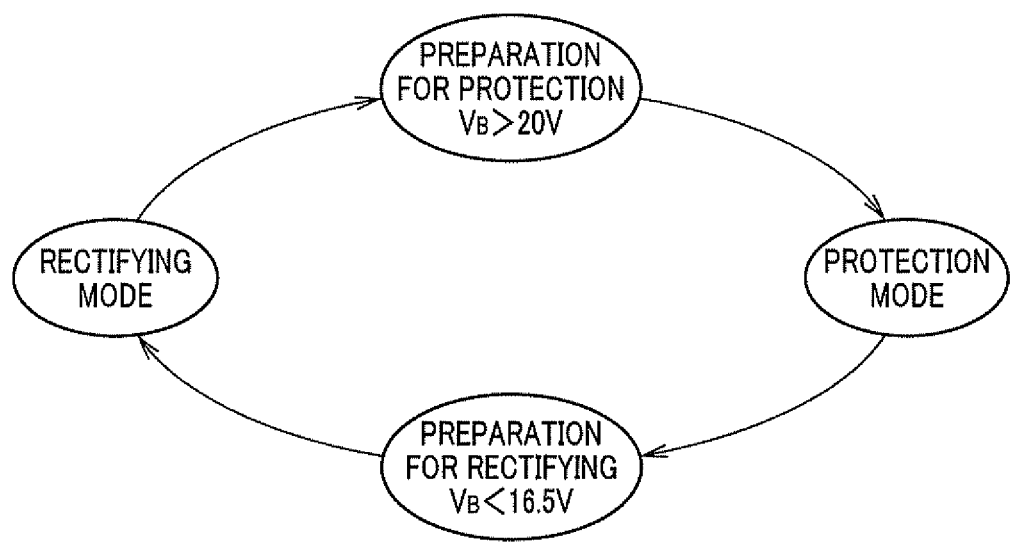
FIG. 4 is a view schematically illustrating mode transitions of the control circuit of a rectifier module according to the first embodiment.

FIG. 4 schematically illustrates mode transitions of the control circuit 54 of a rectifier module 5 according to the first embodiment. Specifically, if it is determined that load dump occurs during each control circuit 54 operating in the rectifying mode, the control circuit 54 of a rectifying module 5 for at least one phase winding across which a high voltage is generated due to the load dump prepares for the protection mode. Thereafter, the control circuit 54 shifts to the protection mode, and operates in the protection mode to decay the load dump voltage. Thereafter, the control circuit 54 prepares for the rectifying mode, and thereafter, operates in the rectifying mode.

(A) of FIG. 5 schematically illustrates an example of the waveform of a phase voltage Vx across a phase winding in the rectifying mode, and (B) of FIG. 5 schematically illustrates an example of the waveform of a high phase voltage generated across the phase winding due to load dump. In (A) and (B) of FIG. 5, reference character a represents the drain-source voltage $V_{DS}$ of each of the high- and low-side MOS transistors 50 and 51 in on state; this α is, for example, 0.1 V.

Referring to (A) of FIG. 5, in the rectifying mode with no load dump, when the X-phase voltage Vx across the X-phase winding exceeds the sum of the output voltage $V_B$ and the voltage α, the control circuit 54 of the rectifier module 5X determines that the corresponding upper arm is within a conductive period during which one phase current can flow through the upper arm (the high-side MOS transistor 50 or the diode 50a). Thus, the controller 100 of the rectifier module 5X turns on the high-side MOS transistor 50 through the driver 170 with the low-side MOS transistor 51 being off. This results in that the X-phase voltage Vx is clamped to substantially the sum of the output voltage $V_B$ and the voltage α (see a range A of one cycle of the X-phase voltage Vx in (A) of FIG. 5).

After the lapse of a preset time, the control circuit 54 of the rectifier module 5X determines that the X-phase voltage Vx is equal to or lower than the sum of the output voltage $V_B$ and the voltage α so that it is determined that the upper arm is out of the conductive period, then turning off the high-side MOS transistor 50 through the driver 170.

Thereafter, when the X-phase voltage Vx drops to be lower than the sum of the ground level (0 V) and −α, the control circuit 54 of the rectifier module 5X determines that the corresponding lower arm is within a conductive period during which one phase current can flow through the lower arm (the low-side MOS transistor 51 or the diode 51*a*). Thus, the control circuit 54 of the rectifier module 5X turns on the low-side MOS transistor 51 through the driver 172. This results in that the X-phase voltage Vx is clamped to substantially the sum of the ground level (0 V) and −α.

After the lapse of a preset time, the control circuit 54 of the rectifier module 5X determines that the X-phase voltage Vx is equal to or higher than the sum of the ground level (0 V) and −α so that it is determined that the lower arm is out of the conductive period, then turning off the low-side MOS transistor 51 through the driver 172.

Each of the remaining rectifier modules 5Y, 5Z, 6U, 6V, and 6Z can perform these on and off drives of a corresponding pair of high- and low-side MOS transistors 50 and 51.

These on and off operations of the MOS transistors 50 and 51 by a rectifier module carry out synchronous rectification of three-phase AC voltages induced in a corresponding one of the first and second stator windings 2 and 3.

During the synchronous rectification being performed in the rectifying mode, the disconnection between the output terminal of the power generator 1 and the charge line 12 or that between the positive terminal of the battery 9 and the charge line 12 causes load dump, that is, the disconnection of the powered stator winding from the battery 9 with the corresponding high-side MOS transistor 50 on and the corresponding low-side MOS transistor 51 off. The load dump causes a high voltage across a corresponding at least one stator winding due to its large impedance (see reference character $V_{LD}$ in (B) of FIG. 5). The phase voltage $V_{LD}$ due to load dump is higher than the output voltage $V_B$, for example, is equal to or higher than 100 V. Thus, the control circuit 54 of a rectifier module corresponding to the at least one stator winding causing the phase voltage $V_{LD}$ prepares for the protection mode, and thereafter, shifts to the protection mode to protect at least some elements in the power generator 1, such as the rectifying modules, the regulator 7, and the electrical loads 10.

Specifically, assuming that the battery 9 is a lead acid battery having a rated voltage of 12 V (in other words, the power generator 1 is a 12-V electrical system), when the phase voltage of at least one stator winding due to load dump exceeds 20 V, the control circuit 54 of a rectifier module corresponding to the at least one stator winding prepares for the protection mode. That is, the load-dump protection determiner 140 of the control circuit 54 is designed to determine an appropriate timing at which the controller 100 shifts to the protection mode, and instruct, at the determined appropriate timing, the controller 100 to start load-dump protection in the protection mode.

The controller 100 of a rectifier module corresponding to the at least one stator winding in the protection mode turns on the low-side MOS transistor 51, and simultaneously turns off or keeps off the high-side MOS transistor 50.

The on state of the low-side MOS transistor 51 and the off state of the high-side MOS transistor 50 clamp the phase voltage across the at least one stator winding to the sum of the ground level (0 V) and α (0.1 V) when the phase voltage across the at least one stator winding rises to α (0.1 V), and clamp the phase voltage across the at least one stator winding to the sum of the ground level (0 V) and −α (−0.1 V) when the phase voltage across the at least one stator winding falls to −α (−0.1 V).

That is, during the protection mode, the phase voltage across the at least one stator winding due to load dump cyclically varies within the range from −α (−0.1 V) to α (0.1 V).

As described above, during the rectifying mode, the high-side MOS transistor 50 is on with the low-side MOS transistor 51 being off within the range A in (A) of FIG. 5. Thus, within the range A, when the high-side switching element 50 in on state and the low-side MOS transistor 51 in off state are instantaneously switched off and on, respectively, there is a risk of a surge being generated across the corresponding phase winding. For example, because actually switched timings from on to off and vice versa of each of the MOS transistors 50 and 51 vary between each other, if the high-side MOS transistor 50 in on state were switched off slightly earlier than the low-side MOS transistor 51 in off state being switched on, current flowing through the corresponding phase winding and through the high-side MOS transistor 50 would be instantaneously interrupted, resulting in a surge across the corresponding phase winding.

In addition, within each of ranges B illustrated in FIG. 5, because there is a potential difference between the source and drain of the low-side switching element 51 although no current flows through the corresponding phase winding, a large phase current may be instantaneously generated when the low-side MOS transistor 51 is switched on, resulting in a large surge across the corresponding winding against the change in the phase current.

As described above, if the controller 100 of a rectifier module 5 or 6 corresponding to at least one phase winding across which a high voltage is generated due to load dump shifted to the protection mode within a range A or B in FIG. 5, a large surge would be generated across the corresponding phase winding. Thus, a corresponding rectifier module 5 or 6 according to the first embodiment is configured to shift to the protection mode after checking that the phase voltage $V_{LD}$ across the corresponding phase winding is within a range C illustrated in FIG. 5. Within the range C, the low-side MOS transistor 51 is on in the rectifying mode.

That is, the load-dump protection determiner 140 of the corresponding rectifier module 5 or 6 according to the first embodiment is configured to determine an appropriate timing to shift to the protection mode when the phase voltage $V_{LD}$ across the corresponding phase winding is within the range C because, within the range C, current continuously flows into the corresponding phase winding through the low-side switching element 51. The controller 100 of a rectifier module corresponding to the at least one stator winding turns on the low-side MOS transistor 51, and simultaneously turns or keeps off the high-side MOS transistor 50.

On the other hand, after decaying a high voltage due to load dump in the protection mode, the control circuit 54 of a rectifier module corresponding to the load dump prepares for the rectifying mode, and thereafter, shifts to the rectifying mode.

Specifically, when the phase voltage of at least one stator winding due to load dump falls below 16.5 V, the control circuit 54 of a rectifier module corresponding to the at least one stator winding prepares for the rectifying mode. That is, the load-dump protection determiner 140 of the control circuit 54 is designed to determine an appropriate timing at which the controller 100 shifts to the rectifying mode, and instruct, at the determined appropriate timing, the controller 100 to start rectifying operations with prevention of the occurrence of a surge during the mode shift to the rectifying mode from the protection mode.

The controller 100 of a rectifier module corresponding to the at least one stator winding in the rectifying mode turns off the low-side MOS transistor 51, and thereafter, carries out synchronous rectification of a three-phase AC voltage induced in a corresponding one of the first and second stator windings 2 and 3 set forth above.

As described above, during the protection mode, the low-side MOS transistor 51 is continuously on so that a phase voltage Vp is generated as illustrated in (B) of FIG. 5. Within a range A or B, turnoff of the low-side MOS transistor 51 causes instantaneous interruption of a large phase current flowing from the corresponding phase winding through the low-side MOS transistor 51, resulting in a surge across a corresponding phase winding. Thus, a corresponding rectifier module 5 or 6 according to the first embodiment is configured to shift to the rectifying mode after checking that the phase voltage Vp across the corresponding phase winding is within a range C illustrated in FIG. 5. That is, the load-dump protection determiner 140 of the corresponding rectifier module 5 or 6 according to the first embodiment is configured to determine a suitable timing to shift to the rectifying mode when the phase voltage Vp across the corresponding phase winding is within the range C. This is because: in the protection mode, a current flows through the low-side switching element 51 into the corresponding phase winding in the same direction as the forward direction of the diode 51a within the range C, and, in the rectifying mode, a current continuously flows through the diode 51a even if the low-side MOS transistor 51 is off.

Next, the detailed structure of the load-dump protection determiner 140 of each of the rectifier modules 5 and 6 will be described hereinafter.

As illustrated in FIG. 6, the load-dump protection determiner 140 includes an output voltage detector 141, a threshold voltage determiner 142, a MOS voltage detector 143, a current-flow direction detector 144, a timing determiner 145, and a timing determiner 146.

The output voltage detector 141 is connected with the output terminal B via the terminal A, and operative to detect the output voltage $V_B$. The threshold voltage determiner 142 is connected with the output voltage detector 141, and operative to receive the output voltage $V_B$ from the output voltage detector 141. The threshold voltage determiner 142 is also operative to determine whether the output voltage $V_B$ exceeds the first threshold voltage V1. In addition, once the output voltage $V_B$ exceeded the first threshold voltage V1, the threshold voltage determiner 142 is operative to determine whether the output voltage $V_B$ falls below the second threshold voltage V2.

FIG. 7 schematically illustrates a relationship between the output voltage $V_B$ and a result of the determination by the threshold voltage determiner 142. In FIG. 7, the horizontal axis represents the output voltage $V_B$ and the vertical axis represents a result of the determination by the threshold voltage determiner 142. Referring to FIG. 7, the threshold voltage determiner 142 outputs an electric signal with a low level (L), such as a voltage with a low level, while the output voltage $V_B$ is equal to or lower than the first threshold voltage V1. If the output voltage $V_B$ exceeds the first threshold voltage V1, the threshold voltage determiner 142 switches its output from the low level signal to an electric signal with a high level (H) higher than the low level, such as a voltage with a high level higher than the low level.

Once the output voltage $V_B$ exceeded the first threshold V1, if the output voltage $V_B$ falls below the second threshold voltage V2, the threshold voltage determiner 142 switches its output from the high level signal to the low level signal.

The MOS voltage detector 143 is connected with the terminals C and D, and with the current-flow direction detector 144. The MOS voltage detector 143 is operative to detect the drain-source voltage $V_{DS}$ of the low-side MOS transistor 51, that is, the potential difference between the terminal C and the terminal D. The current-flow detector 144 is operative to receive the drain-source voltage $V_{DS}$ of the low-side MOS transistor 51 from the MOS voltage detector 143, and to determine, based on the drain-source voltage $V_{DS}$ of the low-side MOS transistor 51, the direction of current through the low-side MOS transistor 51 if the MOS transistor 51 is turned on.

Specifically, before shift to the protection mode from the rectifying mode after the occurrence of load dump, a corresponding phase voltage $V_{LD}$ due to the load dump within the range A or each range B is equal to or higher than 0 V. Thus, determination of whether the phase voltage $V_{LD}$, that is, the drain-source voltage $V_{DS}$ of the low-side MOS transistor 51 is lower than a preset reference voltage $V_{REF}$ defined to be lower than 0 V and higher than −0.1 V allows determination of whether the phase voltage $V_{LD}$ is within a range C, that is, whether current flows through the MOS transistor 51 in the direction opposite to the forward direction of the diode 51a connected parallel to the MOS transistor 51.

That is, the drain-source voltage $V_{DS}$ of the low-side MOS transistor 51 lower than the reference voltage $V_{REF}$ shows that the phase voltage $V_{LD}$ is within the range C, so that the current-flow direction detector 144 outputs the high level signal.

Actually, it may be difficult to detect the drain-source voltage $V_{DS}$ within the voltage range from −0.1 V to +0.1 V with high accuracy, and to compare the phase voltage $V_{LD}$ with the reference voltage $V_{REF}$ with high accuracy. For this reason, the MOS voltage detector 143 is operative to amplify the detected drain-source voltage $V_{DS}$ with a predetermined gain to convert in level the drain-source voltage $V_{DS}$ into a drain-source voltage $V_{DS}'$, and output the drain-source voltage $V_{DS}'$ to the current-flow direction detector 144. The current-flow direction detector 144 is operative to receive the drain-source voltage $V_{DS}'$, and to compare the drain-source voltage $V_{DS}'$ with a reference voltage $V_{REF}'$ whose level is converted from the reference voltage $V_{REF}$ in the same manner as the conversion of the drain-source voltage $V_{DS}$ into the drain-source voltage $V_{DS}'$.

FIG. 8 schematically illustrates a relationship between the drain-source voltage $V_{DS}'$ and the reference voltage $V_{REF}'$. In FIG. 8, the vertical axis represents the converted drain-source voltage $V_{DS}'$, and the horizontal axis represents the drain-source voltage $V_{DS}$. In order to detect the drain-source voltage $V_{DS}$ within the voltage range from −0.1 V to +0.1 V with high accuracy, the voltage range from −0.1 V to +0.1 V is amplified by 20-fold. As an example illustrated in FIG. 8, −0.1 V corresponds to 0 V, +0.1 V corresponds to +5 V, the intermediate (0 V) in the voltage range from −0.1 V to +0.1 V corresponds to +2.5 V, and the voltage range from −0.1 V to +0.1 V corresponds to the voltage range from 0 V to +5 V. Thus, the reference voltage $V_{RF}'$ is set to be lower than 2.5 V and higher than 0 V.

As illustrated in FIG. 8, because, in the protection mode, if the drain-source voltage $V_{DS}$ exceeds +0.1 V or falls below −0.1 V, the drain-source voltage $V_{DS}$ is clamped to +0.1 V or −0.1 V. Thus, the output of the MOS voltage detector 143 is clamped to +5 V if the drain-source voltage $V_{DS}$ exceeds +0.1 V, or clamped to 0 V if the drain-source voltage $V_{DS}$ falls below −0.1 V. Note that, before shift to the protection mode from the rectifying mode after the occurrence of load dump, a corresponding phase voltage $V_{LD}$ due to the load dump within the range C is lower than 0.1 V. Thus, in order to more accurately detect the timing just when the drain-source voltage $V_{DS}$ of the low-side MOS transistor 51 enters in the range C, the reference voltage $V_{REF}'$ need be set to be slightly lower than +5 V.

The current-flow direction detector 144 is operative to receive the drain-source voltage $V_{DS}'$ from the MOS voltage detector 143, compare the drain-source voltage $V_{DS}'$ with the reference voltage $V_{REF}'$, and output a high level signal if the drain-source voltage $V_{DS}'$ is lower than the reference voltage $V_{REF}'$ or output a low level signal if the drain-source voltage $V_{DS}'$ is higher than the reference voltage $V_{REF}'$.

The timing determiner 145 is connected with each of the threshold voltage determiner 142 and the current-flow direction detector 144. The timing determiner 145 is operative to change its output from a low level signal to a high level signal if the output of the current-flow direction detector 144 is changed from the low level signal to the high level signal after change of the output of the threshold voltage determiner 142 from the low level signal to the high level signal. That is, the timing determiner 145 is operative to output the high level signal if the output voltage $V_B$ is higher than the first threshold voltage V1 (20 V) due to the occurrence of load dump, and the drain-source voltage $V_{DS}$ of the low-side MOS transistor 51 is within the range C illustrated in (B) of FIG. 5. The output of the high level signal form the timing determiner 145 represents the instruction (protection start instruction), and is inputted to the controller 100. In response to the input of the protection start instruction, the controller 100 shifts to the protection mode. Then, the controller 100 drives the driver 170 to turn off the high-side MOS transistor 50, and the driver 172 to turn on the MOS transistor 51 in the protection mode, thus starting protection operations against a high voltage due to load dump.

The timing determiner 146 is connected with each of the threshold voltage determiner 142 and the current-flow direction detector 144. The timing determiner 146 is operative to change its output from a low level signal to a high level signal if the output of the current-flow direction detector 144 is changed from the low level signal to the high level signal after change of the output of the threshold voltage determiner 142 from the high level signal to the low level signal. That is, the timing determiner 146 is operative to output the high level signal if the output voltage $V_B$ is lower than the second threshold voltage V2 (16.5 V) once the output voltage $V_B$ exceeded the first voltage V1 (20 V) due to the occurrence of load dump, and the drain-source voltage $V_{DS}$ of the low-side MOS transistor 51 is within the range C illustrated in (B) of FIG. 5. The output of the high level signal form the timing determiner 146 represents the instruction (rectification restart instruction), and is inputted to the controller 100. In response to the input of the rectification restart instruction, the controller 100 shifts to the rectifying mode. Then, the controller 100 drives the driver 172 to turn off the MOS transistor 51 in the rectifying mode, thus starting synchronous rectification of corresponding three-phase AC voltages.

As described above, the power generator 1 according to the first embodiment is configured to determine an appropriate timing of cancelling the protection mode after decaying a high voltage due to the occurrence of load dump by turning on a corresponding low-side MOS transistor 51; the determined appropriate timing prevents or reduces a surge. Thus, the power generator 1 cancels the protection mode and starts rectifying operations at the appropriate timing at which a surge is not generated, thus immediately decaying a high voltage due to load dump without generating a surge during the shift from the protection mode to the rectifying mode.

Particularly, the power generator 1 is configured to determine an appropriate timing of turning off the low-side MOS transistor 51 such that, even if the low-side MOS transistor 51 is turned off at the determined appropriate timing, the occurrence of a surge due to the turnoff of the low-side MOS transistor 51 can be prevented. This makes it possible to reliably prevent the occurrence of a surge at the cancel of the protection mode.

In addition, the power generator 1 according to the first embodiment is configured to determine an appropriate timing of shifting to the protection mode due to the occurrence of load dump; the determined appropriate timing prevents or reduces a surge. Thus, the power generator 1 shifts to the protection mode and starts protection operations against the load dump at the appropriate timing at which a surge is not generated, thus immediately decaying a high voltage due to load dump without generating a surge during the shift from the rectifying mode to the protection mode.

The power generator 1 according to the first embodiment determines, as an appropriate timing of turning off a low-side MOS transistor 51 for preventing the occurrence of a surge set forth above, a timing at which no current flows from a corresponding phase winding to the low-side MOS transistor 51, that is, a timing at which the corresponding phase voltage is not included within the ranges A and B illustrated in FIG. 5. This prevents instantaneous interruption or immediate change of current flowing through the corresponding phase winding connected to the low-side MOS transistor 51 that is switched from off to on or on to off, making it possible to prevent the occurrence of a high surge across the corresponding phase winding.

The power generator 1 according to the first embodiment is configured to detect the drain-source voltage $V_{DS}$ of the low-side MOS transistor 51, and determine the direction of current-flow through the low-side MOS transistor 51 based on the detected drain-source voltage $V_{BS}$. Thus, the power generator 1 determines appropriate timings of the shift from the protection mode to the rectifying mode and the shift from the rectifying mode to the protection mode; each of these timings reliably prevents the occurrence of a surge during a corresponding mode shift.

Moreover, the power generator 1 is configured to determine an appropriate timing of turning off or on the low-side MOS transistor 51 for each of phase windings. This configuration cancels the protection mode at an appropriate timing for each phase winding, and shifts to the protection mode at an appropriate timing for each phase winding. Thus, it is possible to reliably prevent the occurrence of a surge across each phase winding.

As described above, the power generator 1 according to the first embodiment is configured to determine an appropriate timing of shifting to the protection mode for each rectifier module. Thus, only one rectifier module corresponding to one phase winding can shift to the protection mode depending on: the cause of the occurrence of load dump, such as the disconnection of the output terminal of the power generator 1 and the disconnection of the positive terminal of the battery 9, or the amount of a phase current flowing through at least one of the stator windings at the occurrence of load dump.

Let us assume that, for the first stator windings 2, the rectifier module 5X only shifts to the protection mode while the rectifier modules 5Y and 5Z do not shift to the protection mode. In this assumption, during the protection mode, the low-side MOS transistor 51 of the rectifier module 5X is only turned on with the low-side MOS transistors 51 of the other rectifier modules 5Y and 5Z being kept off. For this reason, in the lower a1 in (low-side) of each of the rectifier modules 5Y and 5Z, current flows only through the corresponding transistor 51a. This results in that no current flows through the low-side MOS transistor 51 in the direction from the drain to the source, that is, in the direction from the MOS transistor 51 to the X-phase winding, which may cause the drain-source voltage $V_{DS}$ of the low-side MOS transistor 51 to be equal to or higher than 0 V.

FIG. 9 is a graph schematically illustrating the output of the MOS voltage detector 143 if only one rectifier module for one of the first and second stator windings 2 and 3 shifts to the protection mode while the other rectifier modules do not shift to the protection mode. Referring to FIG. 9, when the output voltage $V_B$ is higher than the first threshold voltage V1 (20 V) so that the one rectifier module shifts to the protection mode at time t0, the output voltage $V_{DS}'$ from the MOS voltage detector 143 constantly maintains 2.5 V corresponding to the drain-source voltage $V_{DS}$ of 0V or more. Thus, as illustrated in FIG. 9, the reference voltage $V_{REF}'$ used by the current-flow direction determiner 144 can be replaced with a reference voltage $V_{REF}''$ higher than the reference voltage $V_{REF}'$. This replacement allows the current-flow direction determiner 144 to reliably detect that the drain-source voltage $V_{DS}'$ is lower than the reference voltage $V_{REF}'''$, and output the high level signal to each of the timing determiners 145 and 146. Thus, even if only one rectifier module shifts to the protection mode so that the output voltage $V_B$, which exceeded the first threshold voltage V1 (20 V) once, falls below the second threshold voltage V2 (16.5 V), it is possible for the only one rectifier module to shift to the rectifying mode.

Only one rectifier module, such as a rectifier module 5X, can carry out load-dump protection in the protection mode when the other rectifier modules, such as rectifier modules 5Y and 5Z, cancel the protection mode to shift to the rectifying mode. Specifically, each of the three rectifier modules for one of the first and second stator windings 2 and 3 is configured to individually determine an appropriate timing of shifting to the rectifying mode. Thus, after two of the three rectifier modules have cancelled the protection mode, only one rectifier module corresponding to one phase winding maintains the protection mode. In this case, the drain-source voltage $V_{DS}$ of the low-side MOS transistor 51 of the only one rectifier module may not be lower than 0 V.

However, even in this case, because the output voltage $V_B$ has been lower than the second threshold voltage V2 (16.5 V), it is possible for the only one rectifier module to shift to the rectifying mode at an appropriate timing within the range C. For example, during all three rectifier modules for one set of three-phase stator windings operating in the protection mode, the output of the current-flow direction detector 144 is alternately switched high and low, and a shift timing from the low level to the high level corresponds to the left edge of the range C or therearound. The rotational speed of the rotor 4M before and after cancelling the protection mode can be substantially constant. Thus, the timing determiner 146 can be configured to detect and hold the cycle T of the change of output of the current-direction determiner 144 from low level to high level. The timing determiner 146 also can be configured to detect a point of time at which the cycle T or an integral multiple of the cycle T, such as 2T, has elapsed since the change timing of the output of the current-direction determiner 144 from low level to high level immediately before the drop of the output voltage $V_B$ from 16.5 V; this change timing is a point of time at which the drain-source voltage $V_{DS}'$ falls from the reference voltage $V_{REF}'$. Then, the timing determiner 146 can be configured to change the output of the timing determiner 146 from low level to high level at the detected point of time, thus outputting the rectification restart instruction to the controller 100.

The power generator 1 according to the first embodiment is configured to detect the drain-source voltage $V_{DS}$ of the low-side MOS transistor 51, and determine an appropriate timing of shifting to the protection mode or an appropriate timing of cancelling the protection mode to shift to the rectifying mode, but the power generator 1 is not limited thereto. Specifically, the power generator 1 according to the first embodiment can be configured to directly detect the direction or value of current flowing through the low-side MOS transistor 51. For example, a current sensing element S, such as a resistor, can be connected to the drain or source of the low-side MOS transistor 51 (see FIG. 2), and the load-dump protection determiner 140 can be configured to measure the direction or value of current flowing through the low-side MOS transistor 51 based on the voltage across the current sensing element S, and determine, based on the measured direction or value, an appropriate timing of shifting to the protection mode or an appropriate timing of cancelling the protection mode to shift to the rectifying mode. In this modification, the load-dump protection determiner 140 can reliably detect a range D (see (B) of FIG. 5) during which a current flows into the MOS transistor 51 or the diode 51a parallel thereto, thus shifting to the protection mode or cancelling the protection mode. This prevents instantaneous interruption or immediate change of current flowing through a corresponding phase winding, making it possible to prevent a surge from being generated from the corresponding phase winding.

In the first embodiment, the load-dump determiner 140 is provided in each rectifier module, but the output voltage determiner 141 and threshold value determiner 142 in the load-dump determiner 140 can not be provided in each rectifier module, and they can be provided for all of the rectifier modules 5 and 6, or for each set of the rectifier modules 5 and the rectifier modules 6.

In addition, the control circuit 54 is provided in each of the rectifier modules, but the control circuit 54 can be provided commonly for all of the rectifier modules 5 and 6 or for each set of the rectifier modules 5 and the rectifier modules 6. However, in these modifications, the MOS voltage detector 143, the current-flow direction determiner 144, and each of the timing determiners 145 and 146 need be provided for each lower-arm MOS transistor (low-side MOS transistor).

Second Embodiment

A power generator according to the second embodiment of the present disclosure will be described hereinafter with reference to FIGS. 10 to 25.

The structure and/or functions of the power generator according to the second embodiment are different from the power generator 1 by the following point. So, the different point will be mainly described hereinafter.

An example of the structure of the regulator 7 of the power generator 1A according to the second embodiment will be illustrated in FIGS. 10 and 11.

Referring to FIGS. 10 and 11, the regulator 7 has terminals B, P, F, and L.

The regulator 7 includes a MOS transistor 71, a flywheel diode 72, resistors 73 and 74, a voltage comparator 75, an exciting current controller 76, a rotation detector 77, and a communication circuit 78.

The communication circuit 78 is operative to carry out serial bidirectional communications, such as LIN communications in accordance with the LIN protocols, with the ECU 8 via the terminal L. Thus, the communication circuit 78 is able to receive data indicative of for example, a target regulated voltage Vreg.

The resistors 73 and 74 constitute a voltage divider. Specifically, one end of the resistor 73 is connected with the terminal B, and the terminal B is connected with the output terminal B of the power generator 1A. The other end of the resistor 73 is connected with one end of the resistor 74, and the other end of the resistor 74 is connected with the signal ground. The connection point between the resistors 73 and 74 is connected with the voltage comparator 75. The voltage divider 73 and 73 is operative to divide the output voltage of the power generator 1A, and a divided value of the output voltage is inputted to the voltage comparator 75. The voltage comparator 75 is connected with the communication circuit 78 and the exciting current controller 76 in addition to the voltage divider 73 and 74. When receiving the divided value of the output voltage from the voltage divider 73 and data indicative of the target regulated voltage Vreg from the communication circuit 78, the voltage comparator 75 is operative to compare the divided value of the output voltage with a reference voltage corresponding to the target regulated voltage Vreg. For example, the voltage comparator 75 is operative to output a high level signal when the reference voltage is higher than the divided value of the output voltage as a result of the comparison, and output a low level signal when the divided value of the output voltage is higher than the reference voltage as a result of the comparison.

The current controller 76 is connected with the voltage comparator 75 and the gate of the MOS transistor 71. The drain of the MOS transistor 71 is connected with the B terminal, and the source is connected with the F terminal and the cathode of the flywheel diode 72. The anode of the flywheel diode 72 is connected with the signal ground. The F terminal is connected with one end of the field winding 4, and the other end of the field winding 4 is grounded.

The current controller 76 is operative to generate a PWM signal consisting of the train of cyclic pulses, each width (on period, duty cycle) of which is determined depending on the output (compared result) of the voltage comparator 75. That is, during the MOS transistor 71 on, a field current flows based on the output voltage $V_B$ through the field winding 4, and during the MOS transistor 71 off, no field current flows through the field winding 4. Thus, the amount (an averaged value) of the filed current flowing through the field winding 4 can be adjusted by the duty cycle, and therefore, the output voltage $V_B$ is feedback controlled based on the adjusted amount of the field current. The flywheel diode 72 is operative to allow current based on charged energy in the field winding 4 after turnoff of the MOS transistor 71 to be circulated therethrough. Note that, in order to reduce abrupt variation in an output current, the current controller 76 can be configured to gradually change the field current.

The rotation detector 77 is connected with the terminal P, and the terminal P is connected with, for example, the X-phase winding of the first stator windings 2. The rotation detector 77 is operative to detect rotation and/or the rotational speed of the rotor 4M based on a phase voltage $V_P$ appearing across the X-phase winding. Specifically, the rotation detector 77 is operative to detect that the magnitude relationship between the phase voltage $V_P$ and a reference voltage for detection of rotation of the rotor 4M varies cyclically to thereby detect rotation of the rotor 4M. If the power generator 1A operates normally so that there are no short-circuit faults in the rectifier module 5X and/or the first stator windings 2, because the phase voltage $V_P$ having a predetermined amplitude appears at the P terminal, the rotation detector 77 can detect rotation of the rotor 4M based on the phase voltage $V_P$. In the second embodiment, minimum time or minimum cycle required for the rotation detector 77 to detect rotation of the rotor 4M is referred to as "minimum time or minimum cycle T1".

The current controller 76 is connected with the rotation detector 77, and operative to receive a detected result of rotation of the rotor 4M from the rotation detector 77. During rotation of the rotor 4M being detected by the rotation detector 77, the current controller 76 is operative to output the PWM signal whose duty cycle is needed to supply, to the field winding 4, a field current required for the power generator 1A to continuously generate power.

However, if the rotor 4M is continuously stopped for a preset period (a preset cycle) T2 or the rotation detector 77 has not detected rotation of the rotor 4M for the preset period T2 or more, the current controller 76 is operative to output the PWM signal whose duty cycle is needed to supply, to the field winding 4, a field current required to set the field current to a value corresponding to an initial state of the field winding 4.

Next, an example of the structure of the rectifier module 5X according to this embodiment will be fully described hereinafter. FIG. 12 schematically illustrates the structure of the rectifier module 5X according to this embodiment. Each of the other rectifier modules 5Y, 5Z, 6U, 6Y, and 6Z has the same structure as the rectifier module 5X.

The structure of the rectifier module 5X according to this embodiment is substantially identical to that of the rectifier module 5X according to the first embodiment except for the following points.

Specifically, the rectifier module 5X according to this embodiment comprises a control circuit 54A different in configuration from the control circuit 54 according to the first embodiment.

FIG. 13 schematically illustrates an example of the structure of the control circuit 54A in detail. Referring to FIG. 13, the control circuit 54A includes a controller 200, a power source 102, an output voltage detector 110, a high-side MOS $V_{DS}$ detector 220, a low-side MOS $V_{DS}$ detector 230, a high-side MOS short-circuit checker 240, a low-side MOS $V_{DS}$ amplifier 242, a current-flow direction detector 244, a temperature detector 250, a driver 170, and a driver 172. The control circuit 54A has, for example, seven terminals B, P, E, F, G1, G2, and ERR. The terminal E is a ground terminal connected via a ground terminal E of the rectifier module 5X with the signal ground. The terminal F is connected with the F terminal of the regulator 7.

The power source 102 has a substantially identical structure as the structure of the power source 102 illustrated in FIG. 3. For example, the power generator 102 is activated at a timing when a field current is supplied from the regulator 7 to the field winding 4 to supply an operating voltage to each component included in the control circuit 54A based on, for example, the output voltage $V_B$ of the power generator 1A. In addition, when the supply of the field current to the field winding 4 is stopped, the power source 102 is deactivated so that the supply of the operating voltage to each component included in the control circuit 54A is stopped. The activation and deactivation of the power source 102 is controlled by the controller 200.

Each of the drivers 170 and 172 has a substantially identical structure as the structure of a corresponding one of the drivers 170 and 172 according to the first embodiment.

The output voltage detector 110 has a substantially identical structure as the structure of the output voltage detector 110 according to the first embodiment. That is, the output voltage detector 110 is operative to output, to the controller 200, digital data corresponding to the output voltage $V_B$ of the power generator 1A.

The high-side MOS $V_{DS}$ detector 220 is connected with the terminal. P, the terminal B, and the controller 200. The high-side MOS $V_{DS}$ detector 220 is operative to detect the drain-source voltage $V_{DS}$ of the high-side MOS transistor 50, compare the drain-source voltage $V_{DS}$ with a preset threshold, and output, to the controller 200, a voltage signal depending on a result of the comparison.

FIG. 14 schematically illustrates how the high-side MOS $V_{DS}$ detector 220 carries out comparing operations. In FIG. 14, the horizontal axis represents the drain-source voltage $V_{DS}$ relative to the output voltage $V_B$ and the vertical axis represents the level of a voltage signal to be outputted from the high-side MOS $V_{DS}$ detector 220. Referring to FIG. 14, when the phase voltage $V_P$ rises to be higher than the output voltage $V_B$ by 0.3 V or more so that the drain-source voltage $V_{DS}$ is equal to or higher than 0.3 V, the high-side MOS $V_{DS}$ detector 220 changes its output signal from a low level (0 V) to a high level (5 V). Thereafter, when the phase voltage $V_P$ becomes lower than the output voltage $V_B$ by 1.0 V or more so that the drain-source voltage $V_{DS}$ is equal to or lower than −0.1 V, the high-side MOS $V_{DS}$ detector 220 changes its output signal from the high level (5 V) to the low level (0 V).

Voltage V10 higher than the output voltage $V_B$ by 0.3 V (see FIG. 18 described later) represents a first threshold according to the second embodiment. The first threshold is to reliably detect the start point of time of a conductive period of the corresponding diode 50a. That is, the first threshold V10 is set to be: higher than the sum of the output voltage $V_B$ and the drain-source voltage $V_{DS}$ (α) of the MOS transistor 50 in on state, and lower than the sum of the output voltage $V_B$ and the forward voltage VF of the diode 50a (see FIG. 18).

Voltage V20 lower than the output voltage $V_B$ by 1.0 V (see FIG. 18) represents a second threshold according to the second embodiment. The second threshold is to reliably detect the end point of time of the conductive period of the corresponding diode 50a. That is, the second threshold V20 is set to be lower than the output voltage $V_B$ (see FIG. 18).

The period from the arrival of the phase voltage $V_P$ to the first threshold V10 to the arrival of the phase voltage $V_P$ to the second threshold V20 is referred to as an "upper-arm on period". Note that the start point of time and the end point of time of the upper-arm on period are respectively shifted from the start point of time and the end point of time of a conducting period of the diode 50a through which current actually flows during the MOS transistor 50 in off. That is, the power generator 1A according to the second embodiment is configured to carry out synchronous rectification of three-phase AC voltages induced in a corresponding one of the first and second stator windings 2 and 3 based on the upper-arm on period.

The low-side MOS $V_{DS}$ detector 230 is connected with the terminal P, the ground terminal E, and the controller 200. The low-side MOS $V_{DS}$ detector 230 is operative to detect the drain-source voltage $V_{DS}$ of the low-side MOS transistor 51, compare the drain-source voltage $V_{DS}$ with a preset threshold, and output, to the controller 200, a voltage signal depending on a result of the comparison.

FIG. 15 schematically illustrates how the low-side MOS $V_{DS}$ detector 230 carries out comparing operations. In FIG. 15, the horizontal axis represents the drain-source voltage $V_{DS}$ relative to a ground voltage $V_{GND}$ and the vertical axis represents the level of a voltage signal to be outputted from the low-side MOS $V_{DS}$ detector 230. Referring to FIG. 15, when the phase voltage $V_P$ falls to be lower than the ground voltage $V_{GND}$ by 0.3 V or less so that the drain-source voltage $V_{DS}$ is equal to or lower than −0.3 V, the low-side MOS $V_{DS}$ detector 230 changes its output signal from the low level (0 V) to the high level (5 V). Thereafter, when the phase voltage $V_P$ becomes higher than the ground voltage $V_{GND}$ by 1.0 V or more so that the drain-source voltage $V_{DS}$ is equal to or higher than 1.0 V, the low-side MOS $V_{DS}$ detector 230 changes its output signal from the high level (5 V) to the low level (0 V).

Voltage V11 lower than the ground voltage $V_{GND}$ by 0.3 V (see FIG. 18) represents a third threshold according to the second embodiment. The third threshold is to reliably detect the start point of time of a conductive period of the corresponding diode 51a. That is, the third threshold V11 is set to be: lower than the subtraction of the drain-source voltage $V_{DS}$ (a) of the MOS transistor 50 in on state from the ground voltage $V_{GND}$ and higher than the subtraction of the forward voltage VF of the diode 51a from the ground voltage $V_{GND}$ (see FIG. 18).

Voltage V21 higher than the ground voltage $V_{GND}$ by 1.0 V (see FIG. 18) represents a fourth threshold according to the second embodiment. The fourth threshold is to reliably detect the end point of time of the conductive period of the corresponding diode 51a. That is, the fourth threshold V21 is set to be higher than the ground voltage $V_{GND}$ (see FIG. 18).

The period from the arrival of the phase voltage $V_P$ to the third threshold V11 to the arrival of the phase voltage $V_P$ to the fourth threshold V21 is referred to as a "lower-arm on period". Note that the start point of time and the end point of time of the lower-arm on period are respectively shifted from the start point of time and the end point of time of a conducting period of the diode 51a through which current actually flows during the MOS transistor 51 in off. That is, the power generator 1A according to the second embodiment is configured to carry out synchronous rectification of three-phase AC voltages induced in a corresponding one of the first and second stator windings 2 and 3 based on the lower-arm on period.

The temperature detector 250 is connected with the controller 200. The temperature detector 250 is comprised of a pair of diodes provided close to the high- and low-side MOS transistors 50 and 51, respectively. The temperature detector 250 is operative to measure the temperature of each of the MOS transistors 50 and 51 based on the forward voltage of a corresponding one of the diodes, and operative to output a voltage signal with a high level if the temperature of each of the MOS transistors 50 and 51 is equal to or higher than a preset first temperature threshold of, for example, 200° C., and output a voltage signal with a low level if the temperature of each of the MOS transistors 50 and 51 is lower than a preset second threshold of, for example, 170° C.

FIG. 16 schematically illustrates schematic results of temperature detecting operations by the temperature detector 250. In FIG. 16, the horizontal axis represents temperature (t), and the vertical axis represents the level of a voltage signal to be outputted from the temperature detector 250. Referring to FIG. 16, when the temperature measured by a diode for a MOS transistor 50 or 51 rises to be equal to or higher than the first temperature threshold of 200° C., the temperature detector 250 changes its output signal from the low level (0 V) to the high level (5 V). Thereafter, when the measured temperature falls below the second temperature threshold of 170° C., the temperature detector 250 changes its output signal from the high level (5 V) to the low level (0 V).

The high-side MOS short-circuit checker 240 is connected with the P terminal and the controller 200. The high-side MOS short-circuit checker 240 is operative to check whether there are no short-circuit faults between the drain and source of the high-side MOS transistor 50. The short-circuit faults include a short-circuit fault of the high-side MOS transistor 50 and a stuck-on fault that is a failure of the driver 170 causing the high-side MOS transistor 50 to be permanently on irrespective of no control of the gate of the high-side MOS transistor 50. If there are no short-circuit faults between the drain and source of the high-side MOS transistor 50, the phase voltage $V_P$ cyclically varies between the output voltage $V_B$ and the ground voltage $V_{GND}$. Otherwise, if there is a short-circuit fault between the drain and source of the high-side MOS transistor 50, that is, the drain and source of the high-side MOS transistor 50 is permanently shorted, the phase voltage $V_P$ is fixed to a value close to the battery voltage $V_B$.

That is, the high-side MOS short-circuit checker 240 is operative to output, to the controller 200, a voltage signal with a high level, such as 5 V when checking that the phase voltage $V_P$ cyclically varies between the output voltage $V_B$ and the ground voltage $V_{GND}$. In contrast, the high-side MOS short-circuit checker 240 is operative to output, to the controller 200, a voltage signal with a low level, such as 0 V when checking that the phase voltage $V_P$ is fixed close to the output voltage $V_B$.

The low-side MOS $V_{DS}$ amplifier 242 is connected with the P terminal, the E terminal, and the current-flow direction detector 244. The low-side MOS $V_{DS}$ amplifier 242 is operative to amplify the drain-source voltage $V_{DS}$ of the low-side MOS transistor 51 with a predetermined gain to convert the drain-source voltage $V_{DS}$ to a drain-source voltage $V_{DSA}$, and output, to the current-flow direction detector 244, the amplified drain-source voltage $V_{DSA}$ to the current-flow direction detector 244.

As well as the current-flow direction detector 144, the current-flow direction detector 244 is operative to receive the drain-source voltage $V_{DSA}$, and to compare the drain-source voltage $V_{DSA}$ with a reference voltage $V_{REF}$. The current-flow determiner 244 is operative to detect the direction of current flow through the low-side MOS transistor 51 based on a result of the comparison, and output, to the controller 200, data indicative of the direction of current flow through the low-side MOS transistor 51.

The controller 200 is operative to:
determine start and end timings of synchronous rectification;
determine on/off timings of each of the MOS transistors 50 and 51 to carry out synchronous rectification;
drive each of the drivers 170 and 172 according to corresponding on/off timings for a corresponding one of the drivers 170 and 172;
determine shift timings to load-dump protection and overheating protection; and
perform the load-dump protection and overheating protection.

FIG. 17 schematically illustrates an example of the detailed structure of the controller 200. Referring to FIG. 17, the controller 200 functionally includes a rotational speed calculator 201, a synchronous-control start determiner 202, a high-side MOS on-timing determiner 203, a low-side MOS on-timing determiner 204, a target electrical angle setter 205, a high-side MOS $T_{FB}$-time calculator 206, a high-side MOS off-timing determiner 207, a low-side MOS $T_{FB}$-time calculator 208, a low-side MOS off-timing determiner 209, a load-dump determiner 211, a power-source activation/deactivation determiner 212, a synchronous control stop determiner 222, an off-timing fault determiner 221, and an overheating protector 223. For example, the controller 200 can be designed as a microcomputer circuit (programmed logic circuit) comprised of at least a CPU and a memory, and these functional blocks can be implemented by running, by the CPU, at least one program stored in the memory. As another example, the controller 200 can be designed as a hardware circuit comprised of hardware units respectively corresponding to the functional blocks, or as a hardware/software hybrid circuit, some of these functional blocks are implemented by some hardware units, and the remaining functional blocks are implemented by software (at least one program) to be run by the CPU.

Next, operations of the rectifier module 5X will be described hereinafter.

Power-Source Activation/Deactivation Determination

The power-source activation/deactivation determiner 212 monitors the F terminal of the regulator 7 via the terminal F to determine whether the field current (width-modulated current pulses) for the field winding 4 is continuously supplied from the F terminal to the field winding 4. When determining that the field current is continuously supplied from the F terminal to the field winding 4 for 30 microseconds (μs), the power-source activation/deactivation determiner 212 instructs the power source 102 to activate. On the other hand, when determining that the supply of the field current is interrupted from the F terminal to the field winding 4 for one second, the power-source activation/deactivation determiner 212 instructs the power source 102 to deactivate. In addition, if the output voltage $V_B$ becomes lower than a reference voltage, such as 5 V, which shows low-voltage fault, the power-source activation/deactivation determiner 212 instructs the power source 102 to deactivate.

Thus, the power-source activation/deactivation determiner 212 enables the power source 102 to activate when the field current is supplied to the field winding 4, and disables the power source 102 to deactivate when the supply of the field current is stopped to the field winding 4. This feature makes it possible to activate the components included in the control circuit 54A of the rectifier module 5X only when the power generator 1A outputs power, thus reducing unnecessary power consumption.

Synchronous Control Operations

FIG. 18 schematically illustrates operations of the controller 200 in synchronous rectification control mode (synchronous control mode), which corresponds to the rectifying mode according to the first embodiment. In FIG. 18, the "UPPER-ARM ON PERIOD" represents the output voltage signal from the high-side MOS $V_{DS}$ detector 220, the "HIGH-SIDE MOS ON PERIOD" represents on/off timings of the high-side MOS transistor 50, the "LOWER-ARM ON PERIOD" represents the output voltage signal from the low-side MOS $V_{DS}$ detector 230, and the "LOW-SIDE MOS ON PERIOD" represents on/off timings of the low-side MOS transistor 51. Reference characters TFB1, TFB2, and ΔT will be described later, and the meaning of the target electrical angle illustrated in FIG. 18 will be described later.

The high-side MOS on-timing determiner 203 monitors the output voltage signal from the high-side MOS $V_{DS}$ detector 220, that is, the upper-arm on period, and determines a rising timing from the low level to the high level in the output voltage signal as an on-timing of the high-side MOS transistor 50, then sending a turn-on instruction to the driver 170. The driver 170 turns on the high-side MOS transistor 50 in response to receiving the turn-on instruction.

The high-side MOS off-timing determiner 207 determines an off timing of the high-side MOS transistor 50 after the lapse of a predetermined time since the turn-on of the high-side MOS transistor 50, and sends a turnoff instruction to the driver 170. The driver 170 turns off the MOS transistor 50 in response to receiving the turnoff instruction.

The predetermined time that determines the off timing is variably set to be earlier by a target electrical angle than the end point of an upper-arm on period, that is, a trailing edge point from the high level to the low level in the output signal from the high-side MOS $V_{DS}$ detector 120 for each turn-on of the high-side MOS transistor 50.

Assuming that diode rectification is carried out through the diode 50a with the MOS transistor 50 permanently off, the target electrical angle serves as a margin that prevents the off timing of the MOS transistor 50 from being delayed from the end point of time of the conductive period of the diode 50a during the diode rectification. The target electrical angle is set by the target electrical angle setter 205. The target electrical angle setter 205 is configured to set the target electrical angle based on the rotational speed of the rotor 4M calculated by the rotational speed calculator 201. The target electrical angle can be constant independently of the rotational speed of the rotor 4M. Preferably, the target electrical angle can be large with the rotational speed of the rotor 4M being within a low-speed range or a high-speed range, and can be small with the rotational speed of the rotor 4M being within an intermediate range between the low-speed range and the high-speed range.

Note that the rotational speed calculator 201 is operative to calculate the rotational speed of the rotor 4M based on: the intervals of rising edges from the low level to the high level in the output signal of the low-side MOS $V_{DS}$ detector 230, or the intervals of falling edges from the high level to the low level in the output signal of the low-side MOS $V_{DS}$ detector 230. Calculation of the rotational speed of the rotor 4M using the output signal of the low-side MOS $V_{DS}$ detector 230 allows stable rotational-speed detection independently of the variations in the output voltage $V_B$ of the power generator 1A.

Similarly, the low-side MOS on-timing determiner 204 monitors the output voltage signal from the low-side MOS $V_{DS}$ detector 230, that is, the lower-arm on period, and determines a rising timing from the low level to the high level in the output voltage signal as an on-timing of the high-side MOS transistor 50, then sending a turn-on instruction to the driver 172. The driver 172 turns on the low-side MOS transistor 51 in response to receiving the turn-on instruction.

The low-side MOS off-timing determiner 209 determines an off timing of the low-side MOS transistor 51 after the lapse of a predetermined time since the turn-on of the low-side MOS transistor 51, and sends a turnoff instruction to the driver 172. The driver 172 turns off the MOS transistor 51 in response to receiving the turnoff instruction.

The predetermined time that determines the off timing is variably set to be earlier by a target electrical angle than the end point of the lower-arm on period, that is, the trailing edge point from the high level to the low level in the output signal from the high-side MOS $V_{DS}$ detector 120 for each turn-on of the low-side MOS transistor 51.

Let us assume that diode rectification is carried out through the diode 51a with the MOS transistor 51 permanently off. In this assumption, the target electrical angle serves as a margin that prevents the off timing of the MOS transistor 51 from being delayed from the end point of time of the conductive period of the diode 51a during the diode rectification. The target electrical angle is set by the target electrical angle setter 205.

Actually, because the end point of a corresponding upper-arm on period is not understood at the turnoff of the actually turn-on high-side MOS transistor 50, the high-side MOS off-timing determiner 207 is configured to determine an off timing of the actually turn-on high-side MOS transistor 50 based on information of the low-side MOS transistor 51 substantially half cycle before the actually turn-on high-side MOS transistor 50, thus enhancing the accuracy of determining an off timing of the actually turn-on high-side MOS transistor 50. Similarly, because the end point of a corresponding lower-arm on period is not understood at the turnoff of the actually turn-on low-side MOS transistor 51, the low-side MOS off-timing determiner 209 is configured to determine an off timing of the actually turn-on low-side MOS transistor 51 based on information of the high-side MOS transistor 50 substantially half cycle before the actually turn-on low-side MOS transistor 51, thus enhancing the accuracy of determining an off timing of the low-side MOS transistor 51.

For example, the high-side MOS off-timing determiner 207 is configured to determine an off timing of the actually turn-on high-side MOS transistor 50 as follows.

Referring to FIG. 18, the low-side MOS $T_{FB}$-time calculator 208 is configured to calculate a time (an electrical angle) $T_{FB2}$ from the turnoff of the low-side MOS transistor 51 substantially half-cycle before the actually turn-on high-side MOS transistor 50 to the end point of time of the corresponding lower-aim on period. The high-side MOS off-timing determiner 207 is configured to subtract the target electrical angle from the electrical angle $T_{FB2}$ to calculate $\Delta T$. If the rotor 4M is stably turned, the electrical angle $T_{FB2}$ should be identical to the target electrical angle so that the $\Delta T$ should be equal to zero. However, many causes may make the $\Delta T$ unequal to zero; these causes include: (1) variations of rotation of the rotor 4M due to acceleration and/or deceleration of the vehicle, (2) ripples of rotation of the engine, (3) variations of the electrical loads 10, (4) variations in the clock cycle of the controller 200 if the controller 200 is designed as a programmed logic circuit, and (5) the delay of actual turnoff of each of the MOS transistors 50 and 51 after output of the turnoff instruction from a corresponding driver 170 or 172 to a corresponding MOS transistor 50 or 51.

Thus, the high-side MOS off-timing calculator 207 is configured to correct, by the $\Delta T$, the low-side MOS on period of the low-side MOS transistor 51 used by the low-side MOS off-timing determiner 209 substantially half cycle before the actually turn-on high-side MOS transistor 50 to thereby determine an off timing of the actually turn-on high-side MOS transistor 50. Specifically, the high-side MOS on period is determined in accordance with the following equation:

$$P_{UON} = P_{LON} + \Delta T \times \beta$$

where $P_{UON}$ represents the high-side MOS on period of the actually turn-on high-side MOS transistor 50, $P_{LON}$ represents the low-side MOS on period of the low-side MOS transistor 51 substantially half cycle before the actually turn-on high-side MOS transistor 50, and $\beta$ represents a correction factor.

For example, if the electrical angle $T_{FB2}$ is lower than the corresponding target electrical angle so that the $\Delta T$ is a negative value, the high-side MOS off-timing determiner 207 determines the high-side MOS on period of the actually turn-on high-side MOS transistor 50 by subtracting the product of the $\Delta T$ and the correction factor $\beta$ from the low-side MOS on period of the low-side MOS transistor 51 substantially half cycle before the actually turn-on high-side MOS transistor 50 (see FIG. 18).

Similarly, the low-side MOS off-timing determiner 209 is configured to determine an off timing of the low-side MOS transistor 51 as follows.

Referring to FIG. 18, the high-side MOS $T_{FB}$-time calculator 206 is configured to calculate a time (an electrical angle) $T_{FB1}$ from the turnoff of the high-side MOS transistor 50 substantially half-cycle before the actually turn-on low-side MOS transistor 51 to the end point of time of the corresponding higher-arm on period. The low-side MOS off-timing determiner 209 is configured to subtract the target electrical angle from the electrical angle $T_{FB1}$ to calculate $\Delta T$.

Thus, the low-side MOS off-timing calculator 209 is configured to correct, by the $\Delta T$, the high-side MOS on period of the high-side MOS transistor 50 used by the high-side MOS off-timing determiner 207 substantially half cycle before the actually turn-on low-side MOS transistor 51 to thereby determine an off timing of the actually turn-on low-side MOS transistor 51. Specifically, the low-side MOS on period is determined in accordance with the following equation:

$$P_{LON1} = P_{UON1} + \Delta T \times \beta$$

where $P_{LON1}$ represents the low-side MOS on period of the actually turn-on low-side MOS transistor 51, $P_{UON1}$ represents the high-side MOS on period of the high-side MOS transistor 50 substantially half cycle before the actually turn-on low-side MOS transistor 51, and $\beta$ represents a correction factor.

For example, if the electrical angle $T_{FB1}$ is higher than the corresponding target electrical angle so that the $\Delta T$ is a positive value, the low-side MOS off-timing determiner 209 determines the low-side MOS on period of the actually turn-on low-side MOS transistor 51 by adding the product of the $\Delta T$ and the correction factor $\beta$ to the high-side MOS on period of the high-side MOS transistor 50 substantially half cycle before the actually turn-on low-side MOS transistor 51 (see FIG. 18).

As described above, the controller 200 of the rectifying module 5X alternately turns on the high-side MOS transistor 50 within a corresponding upper-arm on period, and on the low-side MOS transistor 51 within a corresponding lower-arm on period to thereby rectify corresponding three-phase AC voltages with low loss.

Determination of Start of Synchronous Control

Next, operations of the controller 200 of the rectifier module 5X to determine whether to shift to the synchronous control mode will be described hereinafter.

The controller 200 of the rectifier module 5X is configured to determine whether to shift to the synchronous control mode immediately after activation of the rectifier module 5X or temporarily stop of the synchronous control due to any causes. That is, the controller 200 of the rectifier module 5X is configured to shift to the synchronous control mode immediately after activation of the rectifier module 5X or temporarily stop of the synchronous control due to any causes only when the following synchronous-control start conditions are met. The synchronous-control start determiner 202 is configured to determine whether the synchronous-control start conditions are met, and send a synchronous-control start instruction to each of the high- and low-side on-timing determiner 203 and 204 when it is determined that the synchronous-control start conditions are met. In response to the synchronous-control start instruction, the high- and low-side on-timing determiner 203 and 204 shift to the synchronous control mode, and operate in the synchronous control mode to alternately turn on the high- and low-side MOS transistors 50 and 51 set forth above.

The synchronous-control start conditions include the following first to sixth conditions:

The first condition is that the upper-arm on period and lower-arm on period continuously appear 32 times, in other words, a pair of the upper-arm on period and lower-arm on period continuously appears 16 times assuming that eight pole-pairs (16 field poles) are provided in the rotor 4M. 32 times of appearances of the upper- and lower-arm on periods correspond to mechanically two rotations of the rotor 4M. The first condition can be that the upper-arm on period and lower-arm on period continuously appear 16 times corresponding to one mechanical rotation of the rotor 4M, preset times corresponding to three or more mechanical rotation of the rotor 4M, or preset times except for an integral multiple of one mechanical rotation of the rotor 4M.

The second condition is that the output voltage $V_B$ is within a normal range from 7 V to 18 V, in other words, the output voltage $V_B$ is equal to or higher than 7 V, and equal to or lower than 18 V. The upper and lower limits can be changed. If the power generator 1A is a 24V electrical system, the normal range of the lower and higher limits must be changed.

The third condition is that each of the MOS transistors 50 and 51 is not overheat.

The fourth condition is that the controller 200 of the rectifier module 5X does not operate in the protection mode.

The fifth condition is that the rate of variability in the output voltage $V_B$ is lower than a threshold, such as 0.5 V per 200 microseconds [μs]. Note that how far the rate of variability in the output voltage $V_B$ is accepted changes depending on elements and/or programs used for the rectifier module 5X. Thus, the threshold can be changed depending on elements and/or programs used for the rectifier module 5X.

The sixth condition is that each of the $T_{FB1}$ and $T_{FB2}$ is longer than an acceptable value of, for example, 15 μs. Note that whether each of the $T_{FB1}$ and $T_{FB2}$ is abnormal is determined based on how much each of the $T_{FB1}$ and $T_{FB2}$ is reduced, and on a cause of the abnormality of a corresponding one of the $T_{FB1}$ and $T_{FB2}$. Thus, the acceptable value can be changed depending on the cause of the abnormality of each of the $T_{FB1}$ and $T_{FB2}$. In addition, in the second embodiment, it has been described that the $T_{FB1}$ and $T_{FB2}$ are calculated by the high- and low-side MOS $T_{FB}$-time calculators 206 and 208, respectively, during the synchronous control mode, but they are calculated by the respective high- and low-side MOS $T_{FB}$-time calculators 206 and 208 independently of the operation mode of the controller 200.

FIG. 19 illustrates some elements in the controller 200, which are required to determine whether to shift to the synchronous control mode.

The synchronous-control start determiner 202 includes a determiner 202A, a $V_B$ range determiner 213, a $V_B$ variation determiner 214, and a $T_{FB}$ time determiner 215.

The load dump determiner 211 is configured to, if the output voltage $V_B$ exceeds a first threshold voltage V1, such as 20 V, determines that there is load dump due to the disconnection of at least one powered stator winding from the battery 9; this load dump causes a high voltage across the at least one stator winding. Then, the load dump determiner 211 shifts to the protection mode, instructs the driver 170 to turn off the high-side MOS transistor 50, and instructs the driver 172 to turn on the low-side MOS transistor 51 in the protection mode as well as the first embodiment.

Once the output voltage $V_B$ exceeded the first voltage V1 (20 V) due to the occurrence of load dump, if the output voltage $V_B$ is lower than a second threshold voltage V2, which is set to 17 V in the second embodiment, the load dump determiner 211 is configured to stop load-dump protection in the protection mode. As described in the first embodiment, in order to prevent the occurrence of a surge due to turn-on or turnoff of each of the high- and low-side MOS transistors 50 and 51, the load dump determiner 211 is configured to start the load dump protection and stop the load dump protection within a lower-arm on period illustrated in FIG. 18 as well as the first embodiment.

The load dump determiner 211 is operative to continuously output, in the protection mode, a high level signal (an LD flag with a high level) to the determiner 202A. The load dump determiner 211 is also operative to continuously output, out of the protection mode, a low level signal (the LD flag with a low level) to the determiner 202A. Each of the first and second threshold voltages V1 and V2 can be set to another value.

The $V_B$ range determiner 213 is configured to determine whether the output voltage $V_B$ detected by the output voltage determiner 110 is within the normal range from 7 V to 18 V. The $V_B$ range determiner 213 is configured to output a low level signal if the output voltage $V_B$ is within the normal range, and output a high level signal if the output voltage $V_B$ is out of the normal range.

The $V_B$ variation determiner 214 is configured to determine whether the rate of variability in the output voltage $V_B$ detected by the output voltage determiner 110 is lower than the threshold of 0.5 V per 200 μs. The $V_B$ variation determiner 214 is configured to output a low level signal if the rate of variability in the output voltage $V_B$ is lower than the threshold of 0.5 V per 200 μs, and output a high level signal if the output voltage $V_B$ is equal to or higher than the threshold of 0.5 V per 200 μs.

The $T_{FB}$ time determiner 215 is configured to determine whether each of the $T_{FB1}$ and $T_{FB2}$ calculated by a corresponding one of the high- and low-side MOS $T_{FB}$-time calculators 206 and 208 is longer than the acceptable value of 15 μs. The $T_{FB}$ time determiner 215 is configured to output a low level signal if each of the $T_{FB1}$ and $T_{FB2}$ is longer than the acceptable value of 15 μs, and output a high level signal if none of $T_{FB1}$ and $T_{FB2}$ is longer than the acceptable value of 15 μs.

The overheat protector 223 is configured to determine whether each of the MOS transistors 50 and 51 is overheat based on the output signal from the temperature detector 250. If it is determined that at least one of the MOS transistors 50 and 51 is overheat, the overheat protector 223 is configured to carry out overheat protection to set an overheat flag with a high level, and change its output signal from a low level to the high level.

Note that, in FIG. 19, the $V_B$ range determiner 213, the $V_B$ variation determiner 214, and the $T_{FB}$ time determiner 215 are included in the synchronous-control start determiner 202, but they can be provided out of the synchronous-control start determiner 202. In addition, the controller 200 according to the second embodiment is configured to shift to the synchronous control mode to start the synchronous control only if all of the first to sixth conditions are met, but the controller 200 can be configured to shift to the synchronous control mode to start the synchronous control only if the first condition and at least one of the second to sixth conditions are met.

FIG. 20 schematically illustrates operations of the controller 200 to determine whether to start synchronous control (shift to the synchronous control mode). In FIG. 20, the "COUNT VALUE" represents a count value incremented every time the rising timing (edge) of each of upper-arm periods and lower-arm periods appears. In FIG. 20, the "$T_{FB}$ TIME FLAG" represents the output of the $T_{FB}$ time determiner 215, the "VOLTAGE RANGE FLAG" represents the output of the $V_B$ variation determiner 214, and the "LD FLAG" represents the output of the load dump determiner 211. In addition, in FIG. 20, the "OVERHEAT FLAG" represents the output of the overheat protector 223, and the "VOLTAGE VARIATION FLAG" represents the output of the $V_B$ variation determiner 214. In FIG. 20, "H" represents a high level of a corresponding output, and "L" represents a low level of a corresponding output.

The determiner 202A increments a count value with its initial value (0) by 1 every time the rising timing (edge) of each of upper-arm periods and lower-arm periods appears. When the count value reaches "32", the determiner 202A outputs a low level signal indicative of the start of synchronous control to each of the high-side MOS on-timing determiner 203 and the low-side MOS on-timing determiner 204. The high-side MOS on-timing determiner 203 and the low-side MOS on-timing determiner 204 shift to the synchronous control mode in response to receiving the low level signals, and start synchronous control in the synchronous control mode to alternately turn on the MOS transistors 50 and 51.

In addition, the synchronous-control start determiner 202 continues increment of the count value as long as: the interval in electrical angle between the rising edge of an upper-arm on period and the rising edge of a lower-arm on period adjacently before the upper-arm on period is equal to or lower than one cycle of the upper-arm on periods; and all of the outputs (the $T_{FB}$ time flag, the voltage range flag, the LD flag, the overheat flag, and the voltage variation flag) of the respective $T_{FB}$ time determiner 215, the $V_B$ range determiner 213, the load dump determiner 211, the overheat determiner 223, and the $V_B$ variation determiner 214 are low levels (L).

In contrast, the synchronous-control start determiner 202 resets the count value if the interval in electrical angle between the rising edge of an upper-arm on period and the rising edge of a lower-arm on period adjacently before the upper-arm on period is higher than the one cycle of the upper-arm on periods and/or any one of the outputs of the respective $T_{FB}$ time determiner 215, the V3 range determiner 213, the load dump determiner 211, the overheat determiner 223, and the $V_B$ variation determiner 214 becomes high level (H) before the count value reaches 32 (see "H" of the $T_{FB}$ time flag, and "ONE PERIOD IN ELECTRICAL ANGLE" in FIG. 20).

Thereafter, the synchronous-control start determiner 202 restarts increment of the count value from 0 after: the interval in electrical angle between the rising edge of an upper-arm on period and the rising edge of a lower-arm on period adjacently before the upper-arm on period is equal to or lower than the one cycle of the upper-arm on periods; and all of the outputs of the respective $T_{FB}$ time determiner 215, the $V_B$ range determiner 213, the load dump determiner 211, the overheat determiner 223, and the $V_B$ variation determiner 214 are low levels.

Determination of Stop of Synchronous Control

Next, operations of the controller 200 of the rectifier module 5X to determine whether to shift out of the synchronous control mode will be described hereinafter.

The synchronous-control stop determiner 222 is configured to determine whether the synchronous-control stop conditions are met, and send a synchronous-control stop instruction to each of the synchronous-control start determiner 202, the high- and low-side on-timing determiner 203 and 204, the high-side MOS off-timing determiner 207, and the low-side MOS off-timing determiner 209 when it is determined that the synchronous-control stop conditions are met. Thereafter, the synchronous control is stopped until the synchronous-control start determiner 202 restarts synchronous control.

The synchronous-control stop conditions include the following first to fifth conditions:

The first condition is that a time interval from the off timing determined by the low-side MOS off-timing determiner 209 to the arrival of the rising phase voltage VP to the first threshold voltage V10 used to determine the next on timing of the high-side MOS transistor 50 is shorter than a first preset time interval.

The first preset time interval can be set to an interval from the time at which the low-side MOS off-timing determiner 209 actually sends an instruction of the off timing to the driver 172 to the time of actual turnoff of the MOS transistor 51 by the driver 172. More specifically, the first preset time interval can be set based on the turnoff capability of the driver 172 for the MOS transistor 51. The off-timing fault determiner 221 is configured to output a high level signal if the first condition is met, that is, the interval from the off timing determined by the low-side MOS off-timing determiner 209 to the arrival of the rising phase voltage VP to the first threshold voltage V10 used to determine the next on timing of the high-side MOS transistor 50 is shorter than the first preset time interval. The off-timing fault determiner 221 is configured to output a low level signal if the first condition is not met.

FIG. 21 schematically illustrates a specific example of the waveform of a phase voltage when the off-timing determined by the low-side MOS off-timing determiner 209 is delayed. If the off timing of the MOS transistor 51 is delayed relative to the end timing of the lower-arm on period, a current flowing through the MOS transistor 51 may be interrupted, causing a surge. In FIG. 21, reference character S represents such a surge. The surge may be generated immediately after the turnoff of the MOS transistor 51. When the time interval from the time at which the low-side MOS off-timing determiner 209 actually sends an instruction of the off timing to the driver 172 to the time of actual turnoff of the MOS transistor 51 by the driver 172 is represented as t0 (see FIG. 21), in order to detect the occurrence of a surge due to the delay of the off timing for the MOS transistor 51, the first preset time interval is set to be longer than the time interval t0 by a preset time γ after actually sending the instruction of the off timing to the driver 172. The preset time γ need be shorter than a time required for the phase voltage VP to rise up to the first threshold voltage V10 during normal synchronous control being carried out without the occurrence of off-timing faults.

The second condition is that a time interval from the off timing determined by the high-side MOS off-timing determiner 207 to the arrival of the falling phase voltage VP to the third threshold voltage V11 used to determine the next on timing of the low-side MOS transistor 51 is shorter than a second preset time interval.

The second preset time interval can be set to an interval from the time at which the high-side MOS off-timing determiner 207 actually sends an instruction of the off timing to the driver 170 to the time of actual turnoff of the MOS transistor 50 by the driver 170. More specifically, the second preset time interval can be set based on the turnoff capability of the driver 170 for the MOS transistor 50. The off-timing fault determiner 221 is configured to output a high level signal if the second condition is met, that is, the interval from the off timing determined by the high-side MOS off-timing determiner 207 to the arrival of the falling phase voltage VP to the third threshold voltage V11 used to determine the next on timing of the low-side MOS transistor 51 is shorter than the second preset time interval. The off-timing fault determiner 221 is configured to output a low level signal if the second condition is not met.

Note that the first and second preset time intervals can be identical to each other, or different from each other. It is preferable that each of the first and second preset time intervals is a constant value independently of the rotational speed of the rotor 4M because it is set based on the turnoff performance of a corresponding one of the drivers 170 and 172.

The third condition is that the rate of variability in the output voltage $V_B$ is higher than the threshold, such as 0.5 V per 200 μs. Note that how far the rate of variability in the output voltage $V_B$ is accepted changes depending on elements and/or programs used for the rectifier module 5X. Thus, the threshold can be changed depending on elements and/or programs used for the rectifier module 5X.

FIG. 22 schematically illustrates a relationship between the variation in the output voltage $V_B$ and upper- and lower-arm on periods.

For example, if the output current drops suddenly from 150 A to 50 A, the output voltage V5 rises (see FIG. 22). Then, upper-arm on periods T11 and T12 after the change in the output of the power generator 1A are reduced as compared with an upper-arm on period T10 before the change in the output of the power generator 1A. This similarly appears for lower-arm on periods (see FIG. 22).

As described above, when the upper-arm on period or the lower-arm on period varies to be reduced, an off timing normally determined for at least one of the high- and low-side MOS transistors 50 and 51 set forth above may be delayed relative to a corresponding upper- or lower-arm on period. Thus, the threshold, such as 0.5 V per 200 μs, is used to avoid such a delay. As described above, the threshold for the determination of stop of synchronous control can be identical to that for the determination of start of synchronous control, or different therefrom.

The fourth condition is that the controller 200 of the rectifier module 5X operates in the protection mode.

The fifth condition is that at least one of the MOS transistors 50 and 51 is overheat.

FIG. 23 illustrates some elements in the controller 200, which are required to determine whether to shift out of the synchronous control mode. The $V_B$ variation determiner 214 of the synchronous-control start determiner 202 is used for determination of stop of synchronous control.

Referring to FIG. 23, to the synchronous-control stop determiner 222, the output of each of the off-timing fault determiner 221, the $V_B$ variation determiner 214, the load dump determiner 211, and the overheat protector 223 is inputted.

From the off-timing fault determiner 221, the high level signal is inputted to the synchronous-control stop determiner 222 as long as the first condition or second condition in the synchronous-control stop conditions is met. From the $V_B$ variation determiner 214, the high level signal is inputted to the synchronous-control stop determiner 222 as long as the rate of variability in the output voltage $V_B$ is higher than the threshold of 0.5 V per 200 μs so that the third condition in the synchronous-control stop conditions is satisfied.

In addition, from the load dump determiner 211, the high level signal is inputted to the synchronous-control stop determiner 222 as long as the controller 200 of the rectifier module 5X operates in the protection mode so that the fourth condition is met with the LD flag with the high level being set. From the overheat protector 223, the high level signal is inputted to the synchronous-control stop determiner 222 as long as the fifth condition is met, that is, the overheat flag with the high level is set due to at least one of the MOS transistors 50 and 51 being determined to be overheat.

The synchronous-control stop determiner 222 is configured to determine that at least one of the first to fifth conditions for determination of stop of synchronous control is met if at least one of the outputs of the off-timing fault determiner 221, the $V_B$ variation determiner 214, the load dump determiner 211, and the overheat protector 223 is the high level. Then, the synchronous-control stop determiner 222 sends an instruction to stop synchronous control to each of the synchronous-control start determiner 202, the high-side MOS on-timing determiner 203, the low-side MOS on-timing determiner 204, the high-side MOS off-timing determiner 207, and the low-side MOS off-timing determiner 209.

Load-Dump Protection

Next, operations of the load-dump determiner 211 in the protection mode will be described hereinafter. In this embodiment, like the first embodiment, the load dump determiner 211 is configured to operate in the protection mode to turn off the high-side MOS transistor 50 and turn on the low-side MOS transistor 51 until the output voltage $V_B$ outputted from the output voltage detector 210, which exceeded the first threshold voltage V1 (20 V) once, does not fall up to the second threshold voltage (17 V).

FIG. 24A schematically illustrates an example of the waveform of a phase voltage $V_P$ across a phase winding in the synchronous control mode with no load dump, and FIG. 24B schematically illustrates an example of the waveform of the phase voltage $V_P$ after the occurrence of load dump in the protection mode.

Referring to FIG. 24A, in the synchronous control mode with no load dump, the phase voltage $V_P$ across the X-phase winding cyclically varies between an upper limit close to the output voltage (battery voltage) $V_B$ and a lower limit close to the ground voltage $V_{GND}$.

In contrast, after the occurrence of load dump across the X-phase winding, as illustrated in FIG. 24B, because the low-side MOS transistor 51 is turned on and the high-side MOS transistor 50 is turned off, and the low-side MOS transistor 51 is kept on with the high-side MOS transistor 50 being kept off, the phase voltage $V_P$ across the X-phase winding cyclically varies within the range between a negative value ($-\alpha$) and a positive value ($+\alpha$) of the drain-source voltage $V_{DS}$ in on state relative to the ground voltage $V_{GND}$. Note that, like the first embodiment, in FIG. 24B, the drain-source voltage $V_{DS}$ in on state is set to 0.1 V. The drain-source voltage of the low-side MOS transistor 51 can be changed depending on the type of the low-side switching element 51 and/or a voltage signal (drive signal) to be applied to the gate of the low-side switching element 51.

As described above, determination of whether the phase voltage $V_P$, that is, the drain-source voltage $V_{DS}$ of the low-side MOS transistor 51 is lower than a preset threshold voltage $V_{th}$ defined to be slightly higher than 0 V and lower than 0.1 V allows determination of whether the phase voltage $V_P$ is within a lower-arm on period, that is, whether current flows through the MOS transistor 51 in the direction opposite to the forward direction of the diode 51a connected parallel to the MOS transistor 51.

That is, the drain-source voltage $V_{DS}$ of the low-side MOS transistor 51 lower than the threshold voltage $V_{th}$ shows that the phase voltage $V_P$ is within the lower-arm on period.

Actually, it may be difficult to detect the drain-source voltage $V_{DS}$ within the voltage range from $-0.1$ V to $+0.1$ V with high accuracy, and to compare the phase voltage $V_P$ with the threshold voltage $V_{th}$ with high accuracy. For this reason, the MOS $V_{DS}$ amplifier 242 is operative to amplify the drain-source voltage $V_{DS}$ in on state with a predetermined gain to convert in level the drain-source voltage $V_{DS}$ into a drain-source voltage $V_{DSA}$, and output the drain-source voltage $V_{DSA}$ to the current-flow direction detector 244. The current-flow direction detector 244 is operative to receive the drain-source voltage $V_{DSA}$, and to compare the drain-source voltage $V_{DSA}$ with a threshold voltage $V_{tha}$ whose level is converted from the threshold voltage $V_{th}$ in the same manner as the conversion of the drain-source voltage $V_{DS}$ into the drain-source voltage $V_{DSA}$.

FIG. 24C schematically illustrates a relationship between the drain-source voltage $V_{DSA}$ and the threshold voltage $V_{tha}$. In FIG. 24C, the vertical axis represents the converted drain-source voltage $V_{DSA}$, and the horizontal axis represents the drain-source voltage $V_{DS}$. In order to detect the drain-source voltage $V_{DS}$ within the voltage range from $-0.1$ V to $+0.1$ V with high accuracy, the voltage range from $-0.1$ V to $+0.1$ V is amplified by 5-fold. As an example illustrated in FIG. 24C, $-0.1$ V corresponds to $-0.5$ V, $+0.1$ V corresponds to 0.5 V, the intermediate (0 V) in the voltage range from $-0.1$ V to $+0.1$ V is unchanged, and the voltage range from $-0.1$ V to $+0.1$ V corresponds to the voltage range from $-0.5$ V to $+0.5$ V. Thus, the threshold voltage $V_{tha}$ is set to be higher than 0 V and lower than $+0.5$ V, such as 0.35 V.

As illustrated in FIG. 24C, because, in the protection mode, if the drain-source voltage $V_{DS}$ exceeds $+0.1$ V or falls below $-0.1$ V, the drain-source voltage $V_{DS}$ is clamped to $+0.1$ V or $-0.1$ V. Thus, the output of the MOS $V_{DS}$ amplifier 242 is clamped to $+0.5$ V if the drain-source voltage $V_{DS}$ exceeds $+0.1$ V, or clamped to $-0.5$ V if the drain-source voltage $V_{DS}$ falls below $-0.1$ V.

The current-flow direction detector 244 is operative to receive the drain-source voltage VDSA from the MOS VDS amplifier 242, compare the drain-source voltage VDSA with the threshold voltage Vtha, and output a high level signal if the threshold voltage Vtha is lower than the drain-source voltage VDSA, or output a low level signal if the threshold voltage Vtha is equal to or higher than the drain-source voltage VDSA.

FIG. 24D schematically illustrates an example of the waveform of the amplified drain-source voltage $V_{DSA}$ of the low-side MOS transistor 51. In FIG. 24D, a range W corresponds to a low-side MOS on period of the low-side MOS transistor 51 in the synchronous control mode. That is, the controller 200 according to the second embodiment is configured to start or stop the load dump protection, that is, shift to or out of the protection mode at an appropriate timing within the range W. Thus, during the phase voltage $V_P$ being within the range W, turn-on of the MOS transistor 51 allows a current to flow through the MOS transistor 51 in the same direction as the forward direction of the diode 51a parallely connected to the MOS transistor 51. This prevents or reduces a surge across the corresponding phase winding at the start of the protection mode. In addition, during the phase voltage $V_P$ being within the range W, the direction of current flowing through the MOS transistor 51 and the direction of current flowing through the diode 51a after turnoff of the MOS transistor 51 in order to stop the protection mode are identical to each other. Thus, even if the low-side MOS transistor 51 is turned off within the phase voltage $V_P$ being within the range W, it is possible to prevent or reduce a surge at the stop of the protection mode.

Note that the threshold voltage $V_{tha}$ can have a hysteresis characteristic. For example, the threshold voltage $V_{tha}$ is set to be 0.35 V during the drain-source voltage $V_{DSA}$ being lower than the threshold voltage $V_{th}$, and, after the drain-source voltage $V_{DSA}$ becomes higher than the threshold voltage $V_{tha}$, the threshold voltage $V_{tha}$ is changed to be 0.3 V. Thus, even if the drain-source voltage $V_{DSA}$ is frequently changed around the threshold voltage $V_{tha}$, this configuration can prevent the level of the output signal from the current-flow direction determiner 244 from being frequently switched.

A preset reference voltage $V_R$ to be used by the regulator 7 for detecting the rotational speed of the rotor 4M is set to be higher than the drain-source voltage $V_{DS}$ set forth above. Thus, when the high-side MOS transistor 50 is turned off and the low-side MOS transistor 51 is turned on during the protection mode, the magnitude relationship between the phase voltage $V_P$ and the reference voltage $V_R$ is unchanged so that the regulator 7 cannot detect the rotational speed of the rotor 4M based on the phase voltage $V_P$, and may erroneously determine that the rotor 4M is stopped in rotation. In order to address such a problem, the power generator 1A according to the second embodiment is configured to temporarily turn off the low-side MOS transistor 51 for a short time before a period during which the rotational detector 77 cannot detect rotation of the rotor 4M reaches the preset period T2, thus causing the phase voltage $V_P$ to be higher than the reference voltage $V_R$. The short time is set to be equal to or slightly longer than the minimum time T1 required for the rotation detector 77 to detect rotation of the rotor 4M. This prevents the regulator 7 from erroneously determining that the rotor 4M is stopped in rotation, making it possible for the current controller 76 to maintain the stop of field-current supply to the field winding 4.

FIG. 25 illustrates an example of the detailed structure of the load-dump determiner 211 and some elements in the controller 200, which are required for the load-dump determiner 211 to carry out load-dump protection in the protection mode.

Referring to FIG. 25, the load-dump determiner 211 includes a load-dump detector 281, a load-dump state transition determiner 282, a load-dump protection start determiner 283, a periodic timer 284, a return determiner 285, a limit timer 286, and a low-side MOS forced-turnoff determiner 287.

The load-dump detector 281 is operative to output a signal whose level is changed from low to high when the output voltage $V_B$ detected by the output voltage detector 110 exceeds the first threshold voltage V1 of 20 V; this level of the signal is changed from high to low when the output voltage $V_B$, which exceeded the first threshold voltage V1 of 20 V once, falls up to the second threshold voltage V2. The duration of the high level of the signal outputted from the load-dump detector 281 correspond to the state of load dump being generated across a corresponding stator winding.

The load-dump state transition determiner 282 is operative to output a high level signal (the LD flag with the high level) when the output of the load-dump detector 281 is changed from the low level to the high level, that is, when the output voltage $V_B$ exceeds the first threshold voltage of 20 V. The load-dump state transition determiner 282 is also operative to reset the LD flag, and output a low level signal (the LD flag with a low level) when the output voltage $V_B$, which exceeded the first threshold voltage V1 of 20 V once, falls based on the load-dump protection so that the output of the load-dump detector 281 is changed from the high level to the low level, in other words, the output voltage $V_B$, which exceeded the first threshold voltage V1 of 20 V once, becomes lower than the second threshold voltage of 17 V.

The load-dump protection start determiner 283 is operative to, after checking that the output of the high-side MOS short-circuit checker 240 is low at the moment when the output of the load-dump detector 281 is changed from the low level to the high level, send an instruction to each of the drivers 170 and 172 with the output of the current-flow direction determiner 244 being high level, that is, during the drain-source voltage $V_{DS}$ being within the range W. This instruction causes the driver 170 to turn off the high-side MOS transistor 50, and causes the driver 172 to turn on the low-side MOS transistor 51.

The return determiner 285 is operative to determine the end timing of the load-dump protection. Specifically, the return determiner 285 is operative to determine the timing at which a time-up signal is outputted from the periodic timer 184 or the limit timer 286 as the end timing of the load-dump protection. Then, the return determiner 285 is operative to send, to the load-dump state transition determiner 282, data indicative of the end timing of the load-dump protection, and instruct the drivers 170 and 172 to turn off or keep off the high- and low-side MOS transistors 50 and 51.

The periodic timer 284 is operative to count up when the output of the current-flow direction determiner 244 is changed from the low level to the high level. When the counted value corresponds to a quarter of one cycle of the phase voltage $V_P$, the periodic timer 284 is operative to output the time-up signal to the return determiner 285. The timing at which the output of the current-flow direction determiner 244 is changed from the low level to the high level corresponds to the left-side end of the range W illustrated in FIG. 24D. That is, the end timing of the load-dump protection is determined to a point of time after the quarter of one cycle of the phase voltage $V_P$ has elapsed since the change of the output of the current-flow direction determiner 244 from the low level to the high level. Thus, it is possible to turn off the MOS transistor 51 reliably within the diode conductive period, thus preventing the generation of a surge. The quarter of one cycle of the phase voltage $V_P$ can be changed to another percent of one cycle of the phase voltage $V_P$.

The limit timer 286 is operative to count up when the output of the load-dump detector 281 is changed from the low level to the high level. When the counted value corresponds to two cycles of the phase voltage $V_P$, the limit timer 286 is operative to output the time-up signal to the return determiner 285. The limit timer 286 is provided on the assumption that the timing determination based on the current-flow direction determiner 244 and the periodic timer 284 would be failed (for example, the time-up signal would be outputted from the periodic timer 284 due to the failure of the periodic timer 284). In this assumption, the limit timer 286 forcibly terminates the load-dump protection. The two cycles of the phase voltage $V_P$ can be changed.

The low-side MOS forced-turnoff determiner 287 is configured to, after the load-dump protection is started by the load-dump protection start determiner 283, instruct the driver 172 to temporarily turn off the low-side MOS transistor 51 for a short time before a period during which the rotational detector 77 cannot detect rotation of the rotor 4M reaches the preset period T2. The short time is set to be equal to or slightly longer than the minimum time T1 required for the rotation detector 77 to detect rotation of the rotor 4M. After the lapse of the short time, the low-side MOS forced-turnoff determiner 287 is configured to instruct the driver 172 to turn on the MOS transistor 51. The temporal turnoff operations of the low-side MOS transistor 51 are repeated until the load-dump state is cancelled.

Each of cyclic off timings of the low-side MOS forced-turnoff determiner 287 is set to be within a corresponding range W of the phase voltage $V_P$. For example, each of the cyclic off timings of the low-side MOS forced-turnoff determiner 287 can be set to be synchronized with a corresponding time-up signal is outputted from the periodic timer 284. As another example, it is assumed that the period T2 required to detect the stop of rotation of the rotor 4M is an N multiple of one cycle T0 of the phase voltage $V_P$. In this assumption, after the lapse of an (N−1) multiple of one cycle T0 since the start of load-dump protection, when a time-up signal is outputted from the periodic timer 284, the low-side MOS forced-turnoff determiner 287 is configured to instruct the driver 172 to turn off the low-side MOS transistor 51. Specifically, the lapse of the (N−1) multiple of one cycle T0 of the phase voltage $V_P$ can be detected by counting the number of rising edges of the output of the current-flow determiner 244 or the low-side MOS $V_{DS}$ detector 230 so that the counted value reaches (N−1).

Assuming that the time T1 from the turnoff of the MOS transistor 51 to the turn-on of the MOS transistor 51 again is an M multiple of one cycle T0 of the phase voltage $V_P$, the low-side MOS forced-turnoff determiner 287 is configured to detect the lapse of the M multiple of one cycle T0 of the phase voltage $V_P$ by counting the number of rising edges of the output of the current-flow determiner 244 or the low-side MOS $V_{DS}$ detector 230 so that the counted value reaches M.

A time interval from the turnoff of the low-side MOS transistor 51 to the first appearance of a riding edge of the output of the current-flow determiner 244 or the low-side MOS $V_{DS}$ detector 230 is shorter than one cycle T0 of the phase voltage $V_P$. For this reason, in order to reliably ensure the minimum time T1 required for detection of rotation of the rotor 4M, the threshold M of the count value for detecting the lapse of the minimum time T1 can be changed to (M+1). The lapse of the (N−1) or M multiple of one cycle T0 of the phase voltage $V_P$ can be detected based on the number of falling edges of the output of the high-side MOS $V_{DS}$ detector 220 from the low level to the high level.

Each of the other rectifier modules 5Y, 5Z, 6U, 6Y, and 6Z has the same structure and the same functions as the rectifier module 5X set forth above.

As described above, the power generator 1A according to the second embodiment is configured to determine an appropriate timing of cancelling load-dump protection to shift to the synchronous control mode after operating in the protection mode to decay a high voltage due to load dump; this appropriate timing prevents or reduces a surge during the shift from the protection mode to the synchronous control mode. In addition, the power generator 1A according to the second embodiment is configured to determine an appropriate timing of cancelling synchronous control to shift to the protection mode after operating in the synchronous control mode; this appropriate timing prevents or reduces a surge from the synchronous mode to the protection mode.

Moreover, the power generator 1A is configured to, while holding the low-side MOS transistor 51 on in the protection mode, cyclically turn off the low-side MOS transistor 51. This prevents the regulator 7 from erroneously detecting that the power generator 1A is deactivated to generate power.

The present disclosure is not limited to the aforementioned embodiments, and can be modified within the scope of the present disclosure.

Some of the features of the power generator 1 according to the first embodiment can be applied to the power generator 1A according to the second embodiment, and some of the features of the power generator 1A according to the second embodiment can be applied to the power generator 1 according to the first embodiment.

If the regulator 7 does not detect rotation of the rotor 4M, the power generator 1A can carry out operations to issue an alarm. For example, if the rotation detector 77 does not detect rotation of the motor 4M, the regulator 7 can output audible and/or visible alarms via the communication circuit 78 and/or the ECU 8 for the driver of the vehicle, or can turn on external warning lamps, such as charge lamps, via an alarm circuit (not shown). In this modification, because the low-side MOS transistor 51 is temporarily and cyclically turned on in the protection mode to allow the rotation detector 77 to detect rotation of the rotor 4M, it is possible to prevent erroneous issuance of alarms due to erroneous detection of the stop of rotation of the rotor 4M. In the second embodiment, if the rotation detector 77 does not detect rotation of the rotor 4M for the preset period T2 or more, the current controller 76 can stop the supply of a field current to the field winding 4 without supplying, to the field winding 4, a field current required to set the field current to a value corresponding to an initial state of the field winding 4.

Each of the power generators 1 and 1A according to the first and second embodiments is provided with two sets of first and second stator windings 2 and 3, and with corresponding two sets of rectifier modules 5 and 6, but the present disclosure is not limited thereto. Specifically, each of the power generators 1 and 1A according to the first and second embodiments can be provided with the first stator windings 2 and the rectifier modules 5 therefor.

Each of the power generators 1 and 1A according to the first and second embodiments serves as a power generator to rectify three-phase AC voltages, but the present disclosure is not limited thereto. Specifically, each of the power generators 1 and 1A can be configured to change on and off timings of each of the MOS transistors 50 and 51 to serve as a rotary electric machine (motor) that inverts a DC voltage supplied from the battery 9 into three-phase AC voltages, and that applies the three-phase AC voltages to one set of three-phase stator windings, thus turning the rotor 4M based on a rotating magnetic field induced in the one set of three-phase stator windings according to the three-phase AV voltages.

In each of the power generators 1 and 1A according to the first and second embodiments, three rectifier modules for one set of stator windings are provided, but an alternative number of rectifier modules for one set of stator windings can be provided. In each of the power generators 1 and 1A according to the first and second embodiments, a MOS transistor is provided as each of high-side (upper arm) and low-side (lower arm) switching elements, but a diode can be provided as high-side rectifying element, and a MOS transistor or another type power transistor can be provided as low-side rectifying elements.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A rotary electric machine with a rotatable rotor, the rotary electric machine comprising:
   at least two-phase stator windings;
   a rectifying unit including, for each of the at least two-phase stator windings, a pair of a high-side rectifying element and a low-side rectifying element, at least the low-side rectifying element including a switching element with a diode connected in parallel thereto, the rectifying unit configured to rectify an alternating current voltage induced in each of the at least two-phase stator windings; and a load-dump protector configured to:
monitor an output voltage of the rectifying unit;
turn on the switching element as the low-side rectifying element for at least one of the at least two-phase stator windings when the output voltage exceeds a first threshold voltage due to a load dump;
determine a turnoff timing of the switching element as the low-side rectifying element for the at least one of the at least two-phase stator windings after the output voltage, which exceeded the first threshold voltage once, falls below a second threshold voltage, the second threshold voltage being set to be lower than the first threshold voltage; and
turn off, at the determined turnoff timing, the switching element as the low-side rectifying element for the at least one of the at least two-phase stator windings.

2. The rotary electric machine according to claim 1, wherein the load dump protector is configured to, after the output voltage, which exceeded the first threshold voltage once, falls below the second threshold voltage, determine the turnoff timing of the switching element as the low-side rectifying unit for the at least one of the at least two-phase stator windings, the turnoff timing being a timing to reduce a surge to be generated across the at least one of the at least two-phase stator windings due to turnoff of the switching element.

3. The rotary electric machine according to claim 1, wherein the load dump protector is configured to:
determine a turn-on timing of the switching element as the low-side rectifying unit for the at least one of the at least two-phase stator windings after the output voltage exceeds the first threshold voltage; and
turn on, at the determined turn-on timing, the switching element as the low-side rectifying element for the at least one of the at least two-phase stator windings.

4. The rotary electric machine according to claim 3, wherein the load dump protector is configured to, after the output voltage exceeds the first threshold voltage, determine the turn-on timing of the switching element as the low-side rectifying unit for the at least one of the at least two-phase stator windings, the turn-on timing being a timing to reduce a surge to be generated across the at least one of the at least two-phase stator windings due to the turn-on of the switching element.

5. The rotary electric machine according to claim 2, wherein the turn-off timing is a time when no current flows from the at least one of the at least two-phase stator windings to the switching element as the low-side rectifying element.

6. The rotary electric machine according to claim 5, wherein the turn-off timing is a time when no current flows from the switching element as the low-side rectifying unit to the at least one of the at least two-phase stator windings.

7. The rotary electric machine according to claim 5, wherein the switching element as the low-side rectifying element is a MOS transistor, and the load dump protector includes:
a MOS voltage determiner configured to detect a drain-source voltage of the MOS transistor;
a current-flow direction determiner configured to, if the MOS transistor is turned on, determine a direction of a current flowing through the MOS transistor; and
a timing determiner configured to determine the turn-off timing based on the direction of the current determined by the current-flow direction determiner.

8. The rotary electric machine according to claim 1, wherein the load dump protector is configured to determine the turnoff timing of the switching element as the low-side rectifying unit individually for each of the at least two-phase stator windings.

9. The rotary electric machine according to claim 1, wherein the rotatable rotor includes a field pole, further comprising:
a field winding for magnetizing the field pole; and
a voltage regulator configured to:
control a field current flowing through the field winding to regulate the output voltage to a target voltage;
detect rotation of the rotatable rotor based on a phase voltage across one of the at least two-phase stator windings; and
carry out any one of reduction and stoppage of supply of the field current to the field winding when determining stoppage of rotation of the rotatable rotor,
wherein, when the voltage regulator is unable to detect rotation of the rotatable rotor within a predetermined accuracy criteria, the load dump protector is configured to frequently turn off the switching element as the low-side rectifying unit for the at least one of the at least two-phase stator windings even if the output voltage, which exceeded the first threshold voltage once, is higher than the second threshold voltage.

10. The rotary electric machine according to claim 9, wherein
the voltage regulator is configured to determine stoppage of rotation of the rotatable rotor when the voltage regulator has not detected rotation of the rotatable rotor for a preset first period, and
the load dump protector is configured to cyclically turn off, for at least a preset second period per each cycle, the switching element as the low-side rectifying unit for the at least one of the at least two-phase stator windings before lapse of the first period, the second period being required for the voltage regulator to detect rotation of the rotatable rotor.

11. The rotary electric machine according to claim 9, wherein the voltage regulator is configured to detect rotation of the rotatable rotor based on a fact that a magnitude relationship between the phase voltage across the one of the at least two-phase stator windings and a reference voltage cyclically varies, when the switching element as the low-side rectifying element for the at least one of the at least two-phase stator windings is turned on by the load dump protector, the magnitude relationship between the phase voltage across the one of the at least two-phase stator windings and the reference voltage is unchanged, and, when the switching element as the low-side rectifying element for the at least one of the at least two-phase stator windings is turned off by the load dump protector, the magnitude relationship between the phase voltage across the one of the at least two-phase stator windings and the reference voltage cyclically varies with the rotation of the rotatable rotor.

12. The rotary electric machine according to claim 1, further comprising:
a short-circuit checker configured to check whether there is a short-circuit fault in the high-side rectifying element for the at least one of the at least two-phase stator windings,
the load dump protector being configured to turn off, at the determined turnoff timing, the switching element as the low-side rectifying element for the at least one of the at least two-phase stator windings after the short-circuit checker checks that there is not a short-circuit fault in the high-side rectifying element for the at least one of the at least two-phase stator windings.

13. The rotary electric machine according to claim 1, wherein the turnoff timing of the switching element as the low-side rectifying element for the at least one of the at least two-phase stator windings is a time when a direction of a current flowing through the switching element before turnoff of the switching element and a direction of a current flowing in the diode after turnoff of the switching element are identical to each other.

14. The rotary electric machine according to claim 3, wherein the turn-on timing of the switching element as the low-side rectifying element for the at least one of the at least two-phase stator windings is a time when a current flows through the switching element in an on state in a same direction as a forward direction of the diode.

* * * * *